US012696983B2

(12) United States Patent
Freelend et al.

(10) Patent No.: US 12,696,983 B2
(45) Date of Patent: Aug. 4, 2026

(54) BEDDING FOUNDATION HAVING MASSAGER MOVABLE FOR MASSAGE EFFECT

(71) Applicant: L&P Property Management Company, South Gate, CA (US)

(72) Inventors: Isaac T. Freelend, Reeds, MO (US); Jacob J. Neuenswander, Carthage, MO (US); Jason J. Stokesbary, Joplin, MO (US); Dustin D. Smith, Carthage, MO (US)

(73) Assignee: L&P Property Management Company, Carthage, MO (US)

( * ) Notice: Subject to any disclaimer, the term of this patent is extended or adjusted under 35 U.S.C. 154(b) by 104 days.

(21) Appl. No.: 18/774,306

(22) Filed: Jul. 16, 2024

(65) Prior Publication Data

US 2024/0365989 A1 Nov. 7, 2024

Related U.S. Application Data

(60) Continuation-in-part of application No. 18/422,141, filed on Jan. 25, 2024, now abandoned, which is a (Continued)

(51) Int. Cl.
*A47C 19/02* (2006.01)
*A47C 21/00* (2006.01)
(Continued)

(52) U.S. Cl.
CPC ............ *A47C 19/021* (2013.01); *A61G 7/018* (2013.01); *A47C 21/006* (2013.01); *A61H 15/00* (2013.01); *Y10S 5/933* (2013.01); *Y10S 5/934* (2013.01)

(58) Field of Classification Search
CPC ..... A47C 21/006; A47C 19/00; A47C 19/005; A47C 19/021; A47C 20/041; Y10S 5/933;
(Continued)

(56) References Cited

U.S. PATENT DOCUMENTS

| | | | |
|---|---|---|---|
| 4,947,833 | A | 8/1990 | Yamasaki |
| 5,088,475 | A | 2/1992 | Steffensmeier |

(Continued)

FOREIGN PATENT DOCUMENTS

| | | | |
|---|---|---|---|
| CN | 201227396 Y | 4/2009 | |
| FR | 2690619 A1 | 11/1993 | |

(Continued)

OTHER PUBLICATIONS

"Definition of Hollow." Merriam-Webster Dictionary, Aug. 5, 2023, www.merriam-webster.com/dictionary/hollow. (2023).

*Primary Examiner* — Justin C Mikowski
*Assistant Examiner* — Deborah Talitha Gedeon
(74) *Attorney, Agent, or Firm* — Wood Herron & Evans LLP

(57) ABSTRACT

A bedding foundation has a motorized linear actuator for moving a carriage forward and backwards. The carriage includes wheels which move along side rails of a frame. A rigid platform having an opening extending through the platform is secured to the frame. The carriage includes a lift motor assembly which raises and lowers a massager independently of the movement of the linear actuator. Regardless of the position of the linear actuator, the massager may be raised or lowered. The massager moves back and forth inside the opening extending through the rigid platform and imparts a massage movement to a mattress above the foundation.

18 Claims, 34 Drawing Sheets

Related U.S. Application Data division of application No. 17/167,402, filed on Feb. 4, 2021, now Pat. No. 11,896,129.

(60) Provisional application No. 63/012,989, filed on Apr. 21, 2020.

(51) Int. Cl.

*A61G 7/018* (2006.01)
*A61H 15/00* (2006.01)

(58) Field of Classification Search

CPC . Y10S 5/934; A61H 2201/0142; A61H 15/00; A61H 2015/0014; A61H 15/0078; A61H 2015/0064; A61H 2015/0071; A61H 2015/0007; A61H 2015/0021; A61H 2203/0456; A61H 2007/009; A61H 23/00; A61H 23/0218; A61G 7/018; B60N 2/66

USPC ..................... 601/99, 98, 103, 116, 100, 102

See application file for complete search history.

(56) References Cited

U.S. PATENT DOCUMENTS

| | | | | | |
|---|---|---|---|---|---|
| 6,071,252 | A * | 6/2000 | Marcantoni | A61H 15/0078 601/99 |
| 6,454,731 | B1 | 9/2002 | Marcantoni | |
| 12,005,020 | B2 * | 6/2024 | Grey | A61G 13/009 |
| 2005/0010143 | A1 | 1/2005 | Kim | |
| 2014/0188018 | A1 * | 7/2014 | Vaughn | A61H 7/007 601/90 |
| 2019/0223609 | A1 | 7/2019 | Sherman et al. | |

FOREIGN PATENT DOCUMENTS

| | | | | |
|---|---|---|---|---|
| GB | 2174596 | A | | 11/1986 |
| JP | 2009195543 | A | * | 9/2009 |

* cited by examiner

BEDDING FOUNDATION HAVING MASSAGER MOVABLE FOR MASSAGE EFFECT

CROSS-REFERENCE TO RELATED APPLICATIONS

This application is a Continuation-In-Part of U.S. patent application Ser. No. 18/422,141 filed Jan. 25, 2024 (pending), which is a divisional of U.S. patent application Ser. No. 17/167,402 filed Feb. 4, 2021, now U.S. Pat. No. 11,896,129, which claims the benefit of priority to U.S. Provisional Patent Application Ser. No. 63/012,989 filed Apr. 21, 2020. The disclosure of each of these applications is fully incorporated by reference herein in its entirety.

FIELD OF THE INVENTION

This invention relates generally to a bedding foundation having a lift actuator and linear actuator to move a roller or similar apparatus to impart a massage effect on a mattress above the foundation.

BACKGROUND OF THE INVENTION

In the bedding industry, bases or foundations for supporting mattresses fall into two categories: 1) stationary foundations, which do not have any moving parts, and 2) adjustable bed bases which are usually motorized and have moving parts for inclining a portion of a mattress resting on the adjustable bed base and sometimes vibrating a portion of a mattress resting on the adjustable bed base.

Commonly adjustable bed bases include one or more motors which activate one or more drivers of the adjustable bed base to raise a portion of the bed base and mattress. In addition, such adjustable bed bases may include one or more vibratory motors which may impart vibrations to the mattress for a "massage" type effect or feel. Consequently, due to the hardware and electronics necessary to move a portion of an adjustable bed base, the adjustable bed base may be heavy and difficult to transport. Conventional stationary bedding foundations are commonly much lighter and easier to transport.

Adjustable bed bases are typically more expensive than conventional stationary bedding foundations because they have one or more motors for moving parts. Thus, a need exists in the bedding industry for a bedding foundation which combines desirable features of both adjustable bed bases and conventional standard bedding foundations.

SUMMARY OF THE INVENTION

According to one aspect of the invention, a bedding foundation comprises a generally rectangular frame comprising two end rails and two side rails. Each of the end rails is preferably a hollow member but may be a solid member. Each of the side rails has a C-shaped cross section comprising an upper wall portion, a side wall portion and a lower wall portion. The generally rectangular frame is supported by legs or leg assemblies.

The bedding foundation further comprises a rigid platform supported by the generally rectangular frame. The rigid platform has an opening covered by a cover. The cover is conventionally secured to the rigid platform. The rigid platform has a footprint larger than the generally rectangular frame and extends outwardly from the perimeter of the generally rectangular frame. The rigid platform may be surrounded by a protective shroud.

The bedding foundation further comprises stationary front and rear cross members secured to the side rails of the generally rectangular frame. Each cross member extends between the side rails of the generally rectangular frame and is preferably hollow.

A motorized linear actuator extends between the cross members and may be remotely actuated. The linear actuator moves a bus from front to back of the bedding foundation. A carriage bracket is secured to the bus and moves linearly with the bus.

A movable carriage is secured to the carriage bracket and is movable by the motorized linear actuator from front to back of the bedding foundation. The movable carriage includes a front carriage member, a rear carriage member and side plates extending between the front and rear carriage members. The front and rear carriage members are preferably hollow and straight. The movable carriage further comprises four wheels, two wheels secured to each of the side plates of the movable carriage. The wheels engage the side rails of the generally rectangular frame and move inside the channels of the side rails of the generally rectangular frame. When the motorized linear actuator moves, the carriage horizontally the wheels guide the movement of the carriage. The carriage bracket is preferably secured to the rear carriage member to join the movable carriage to the motorized linear actuator.

The movable carriage further comprises a lift motor assembly for raising and lowering a massager. The lift motor assembly moves with the movable carriage and comprises a lift motor, a lift motor housing, a cylinder and a piston movable relative to the cylinder. The lift motor housing is pivotally supported by a front support bracket. The front support bracket is secured to the front carriage member. The movable carriage further comprises a pivotal torque tube extending between the side plates of the movable carriage. A pin extends through the piston of the lift motor assembly and two spaced arms extend between the pin and the torque tube. Extension of the piston of the lift motor assembly causes rotational movement of the torque tube via the arms. Rotational movement of the torque tube pivots links secured to a massager to move the massager between a raised position and a lowered position. The carriage is movable in a horizontal direction by the motorized linear actuator. The massager of the carriage is movable in a vertical direction by the lift motor assembly. The massager may be a roller, an oval shaped piece or any other desired or known member. The shape or configuration of the massager may be any known shape or configuration.

In a second aspect, a bedding foundation comprises a generally rectangular frame comprising two end rails and two side rails. Each of the end rails is a hollow member. Each of the side rails has a C-shaped cross section comprising an upper wall portion, a side wall portion and a lower wall portion. The generally rectangular frame is supported by legs or leg assemblies.

The bedding foundation further comprises a rigid platform supported by the generally rectangular frame. The rigid platform has an opening. The rigid platform has a footprint larger than the generally rectangular frame and extends outwardly from the perimeter of the generally rectangular frame.

The bedding foundation further comprises stationary front and rear cross members secured to the side rails of the generally rectangular frame. Each stationary cross member extends between the side rails of the generally rectangular frame and is preferably hollow.

The bedding foundation further comprises a motorized linear actuator comprising a threaded rod rotated by an actuator motor and a bus movable upon rotation of the threaded rod. One end of the motorized linear actuator is secured to the front cross member. The other end of the motorized linear actuator is secured to a rear mounting bracket secured to the rear cross member. The motorized linear actuator may be remotely actuated.

The bedding foundation further comprises a movable carriage secured to a carriage bracket secured to the bus. The carriage is movable by the motorized linear actuator from front to back of the bedding foundation. The movable carriage includes a front carriage member, a rear carriage member and side plates extending between the front and rear carriage members. The front and rear carriage members are preferably hollow and straight. The movable carriage further comprises four wheels, two wheels secured to each of the side plates of the movable carriage. The wheels engage the side rails of the generally rectangular frame and move inside the channels of the side rails of the generally rectangular frame. When the linear actuator moves the carriage horizontally, the wheels guide the movement of the carriage.

The movable carriage further comprises a lift motor assembly for raising and lowering a massager. The lift motor assembly moves with the movable carriage and comprises a lift motor, a lift motor housing, a cylinder and a piston movable relative to the cylinder. The housing is pivotally supported by a front support bracket. The front support bracket is secured to the front carriage member. The movable carriage further comprises a pivotal torque tube extending between the side plates of the movable carriage. The movable carriage further comprises a pin which extends through the piston of the lift motor assembly. Two spaced arms extend between the pin and the torque tube. The movable carriage further comprises a massager and links extending between the massager and the torque tube. Extension of the piston of the lift motor assembly pivots the torque tube using the arms, thereby moving the massager between a raised position and a lowered position. The carriage is movable in a horizontal direction by the motorized linear actuator. The massager of the carriage is movable in a vertical direction by the lift motor assembly.

In a third aspect, a method of providing a massaging feeling to a mattress from a massage mechanism built into a bedding foundation. The first step in the method comprises raising a massager through an opening in a rigid platform using a lift motor assembly. The massager remains below a flexible cover covering the opening in the rigid platform. The rigid platform is supported by a generally rectangular frame supported by legs. The rigid platform has a footprint larger than the generally rectangular frame and extends outwardly from the perimeter of the generally rectangular frame.

The next step in the method is moving the massager from front to back inside the opening with the massager in its raised position by activating a linear actuator. The linear actuator comprises actuator motor for rotating a threaded rod. The linear actuator extends between cross members, the cross members extending between side rails of the generally rectangular frame. The linear actuator horizontally moves a bus to which is secured a carriage bracket. The rear carriage member is secured to the carriage bracket. The movable carriage further comprises wheels engaging the side rails for guiding movement of the movable carriage. The lift motor assembly is inside the movable carriage and lifts a massager when activated. The massager is secured to links connected to arms of the lift motor assembly. The arms are rotated or pivoted when the piston is extended. Rotation of the arms causes rotation of the torque tube which pivots the links to raise the massager.

The accompanying drawings, which are incorporated in and constitute a part of this specification, illustrate embodiments of the invention and, together with the summary of the invention given above, and the detailed description of the drawings given below, explain the principles of the present invention.

DETAILED DESCRIPTION OF THE INVENTION

Figure 1:
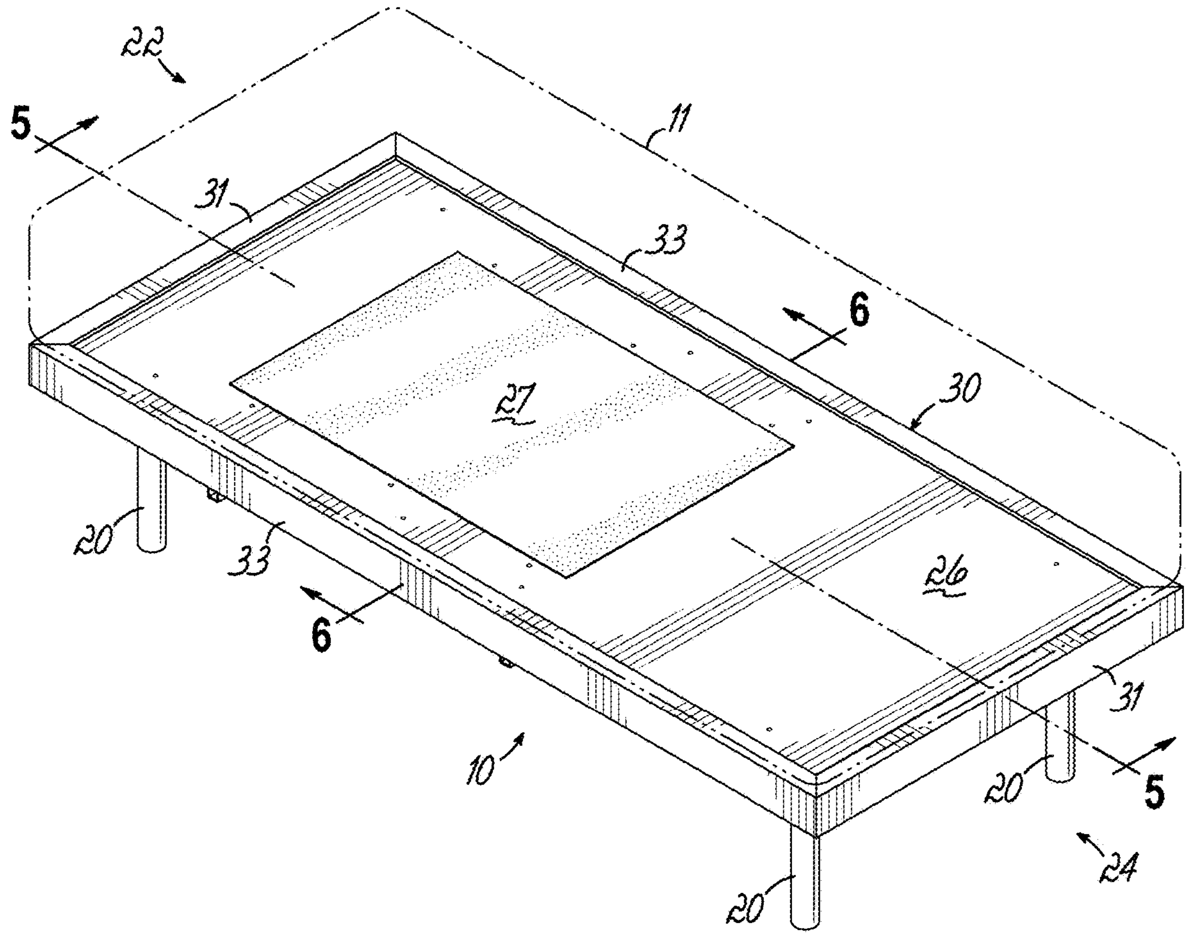
FIG. 1 is a perspective view of a bedding foundation in accordance with one embodiment of the present invention.

Referring first to FIG. 1, there is illustrated a bedding foundation 10 incorporating the principles of the present invention. As seen in FIG. 1, the bedding foundation 10 is used to support a mattress 11, shown in dashed lines. Any mattress may be supported by the bedding foundation; this document is not intended to limit the type of mattress which may be supported.

Figure 2:
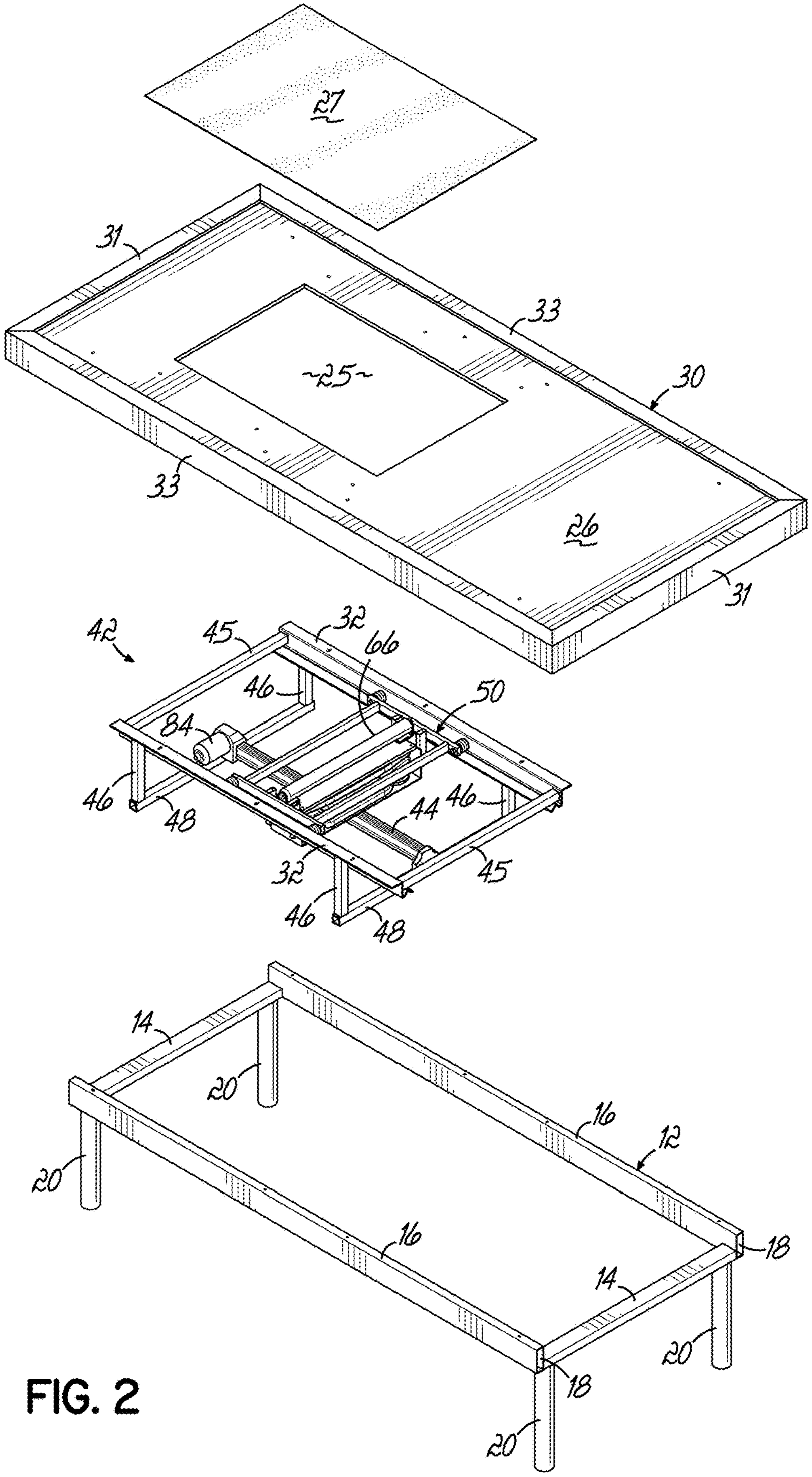
FIG. 2 is a partially disassembled view of the bedding foundation of FIG. 1.
Figure 6:
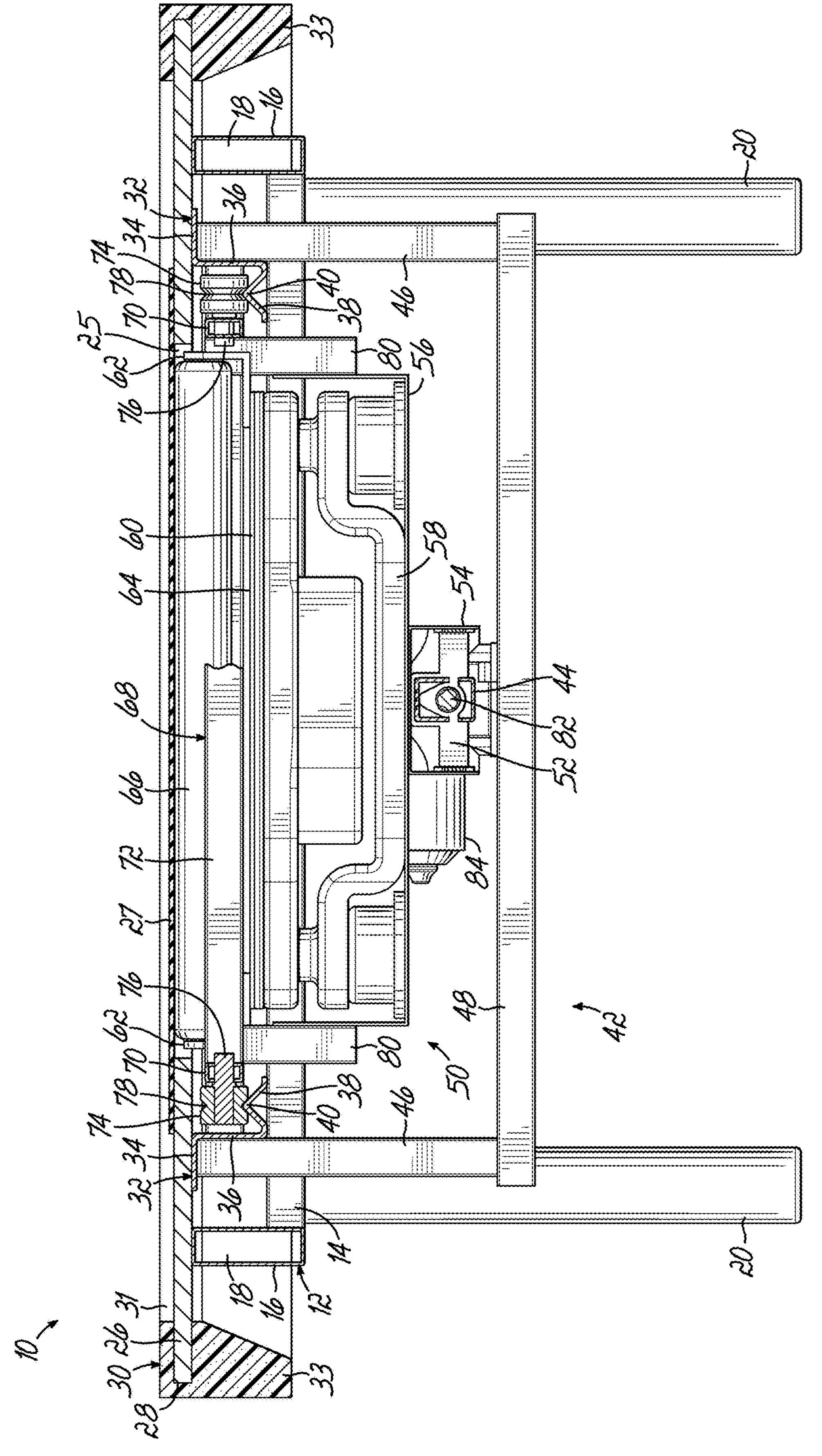
FIG. 6 is a schematic cross-sectional view taken along the line 6-6 of FIG. 1.

As best shown in FIG. 2, the bedding foundation 10 comprises a generally rectangular frame 12, comprising two end rails 14 and two side rails 16. As best shown in FIG. 2, the end and side rails 14, 16 may be secured together with any conventional means, including fasteners. As best shown in FIGS. 2 and 6, each of the end rails 14 and each of the side rails 14 has a hollow interior 18.

Legs 20 support the rectangular frame 12 above the ground a desired distance. Although the legs 20 are illustrated being secured to the end rails 14, they may be secured to any part of the generally rectangular frame 12. Although one configuration of leg is shown, the legs may be any shape or size in any of the embodiments. The present invention is not intended to limit the legs in any manner in any of the embodiments.

For purposes of this document, the head end of the bedding foundation 10 will be indicated by the numeral 22 while the foot end of the bedding foundation 10 will be indicated by the numeral 24.

Figure 4:
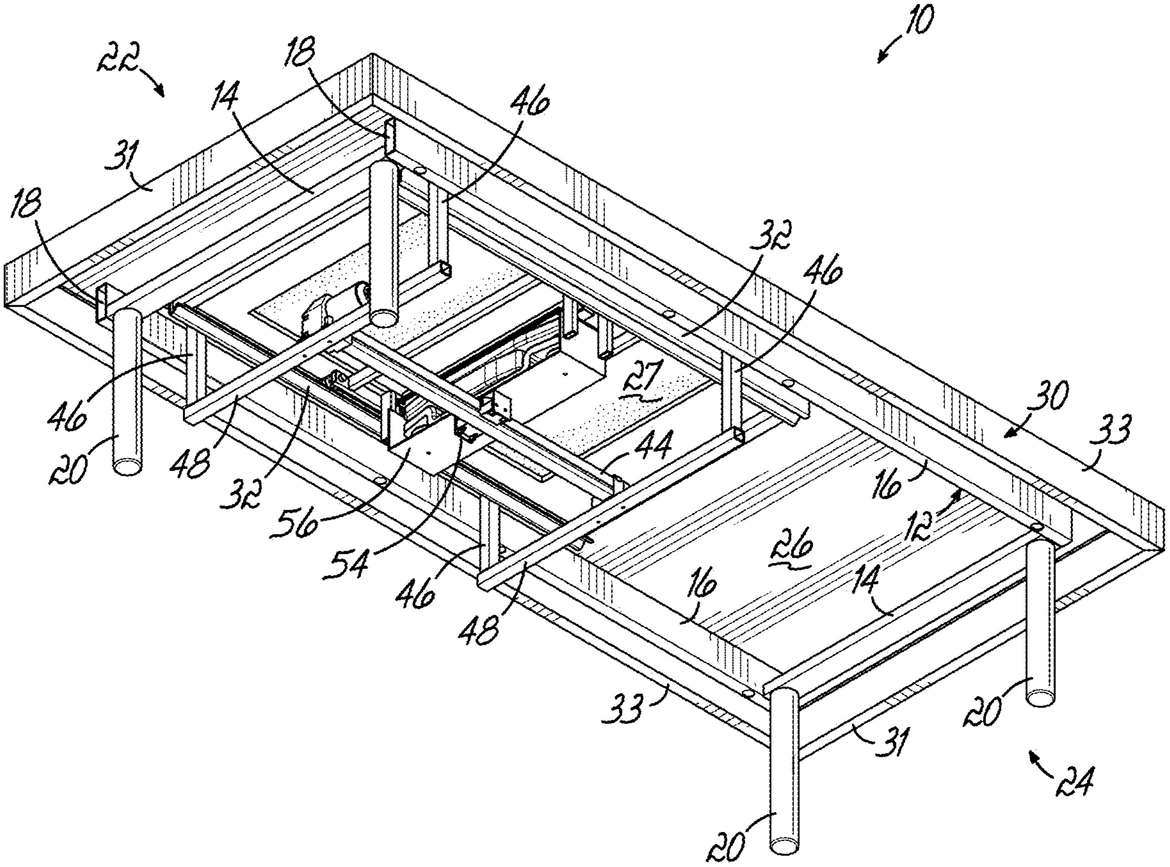
FIG. 4 is a bottom perspective view of the bedding foundation of FIG. 1.
Figure 5:
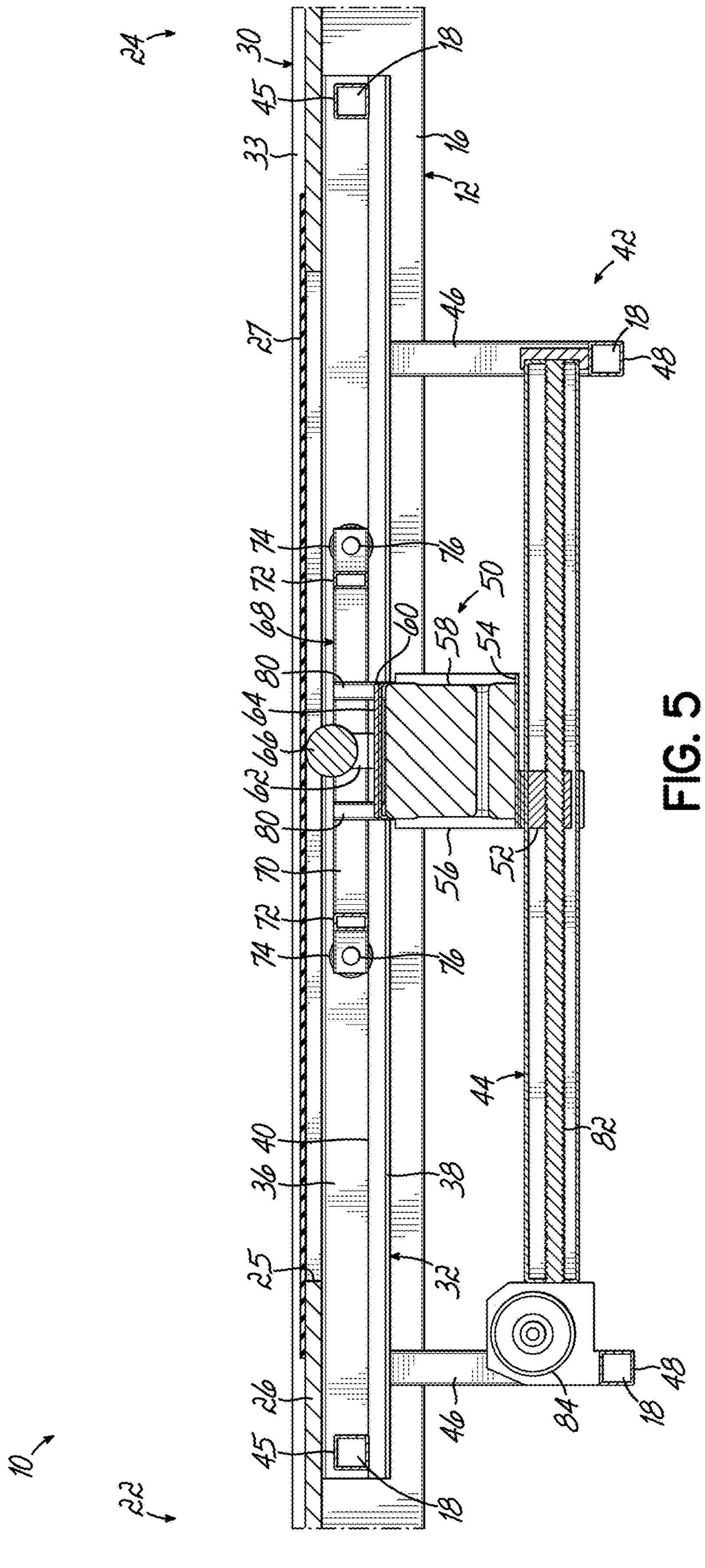
FIG. 5 is a schematic cross-sectional view taken along the line 5-5 of FIG. 1 showing the roller in a lowered position.

As best shown in FIG. 2, a rigid platform 26 is secured to the generally rectangular frame 12 in any known manner. As best shown in FIGS. 4 and 5, the rigid platform 26 has a larger footprint than the generally rectangular frame 12 and extends outwardly from the perimeter of the generally rectangular frame 12 on all four sides. As best shown in FIG. 6, the rigid platform 26 has a perimeter edge 28 about which is placed a protective shroud 30. As best shown in FIG. 2, the protective shroud 30 comprises four pieces joined together at the corners using any known method: two end pieces 31 of the same length and two side pieces 33 of a different, greater length.

The rigid platform 26 is typically made of wood but may be made of any known material. The protective shroud 30 may be made of rubber, plastic, or any soft material. One purpose of the protective shroud 30 to protect users from contacting the perimeter edge 28 of the rigid platform 26 to prevent injuries.

Figure 5A:
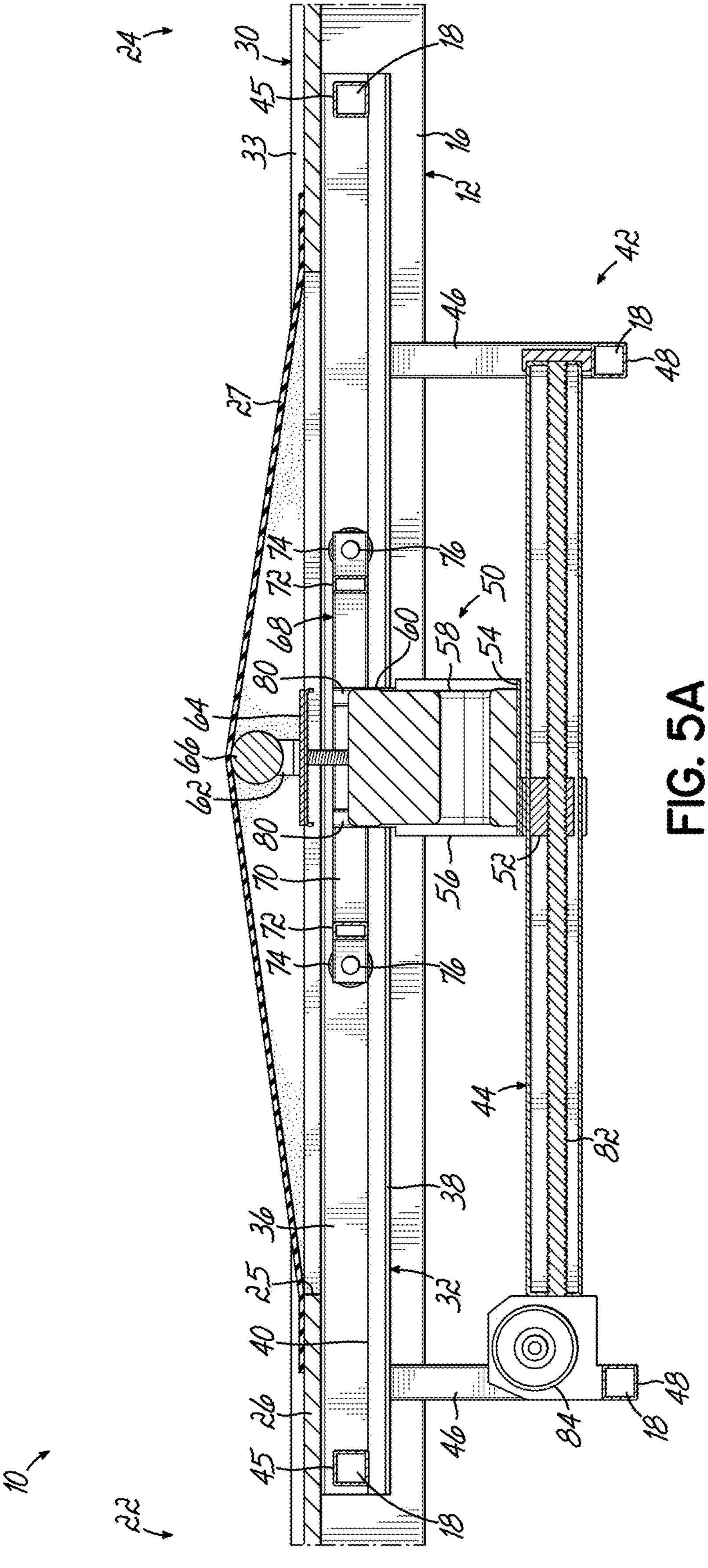
FIG. 5A is a cross-sectional view like FIG. 5 showing the roller in a raised position.
Figure 5B:
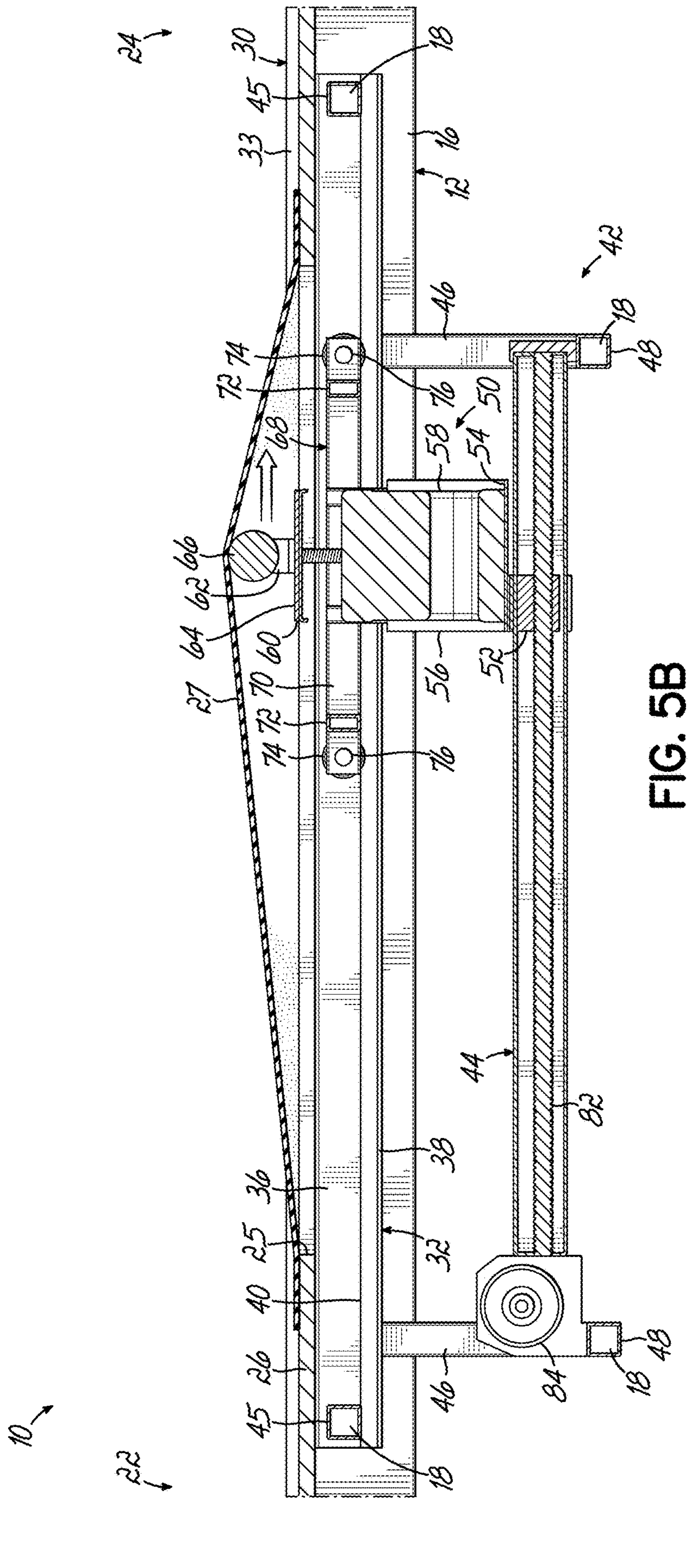
FIG. 5B is a cross-sectional view like FIG. 5 showing the roller in a raised position and moving rearward from its position shown in FIG. 5A.
Figure 5C:
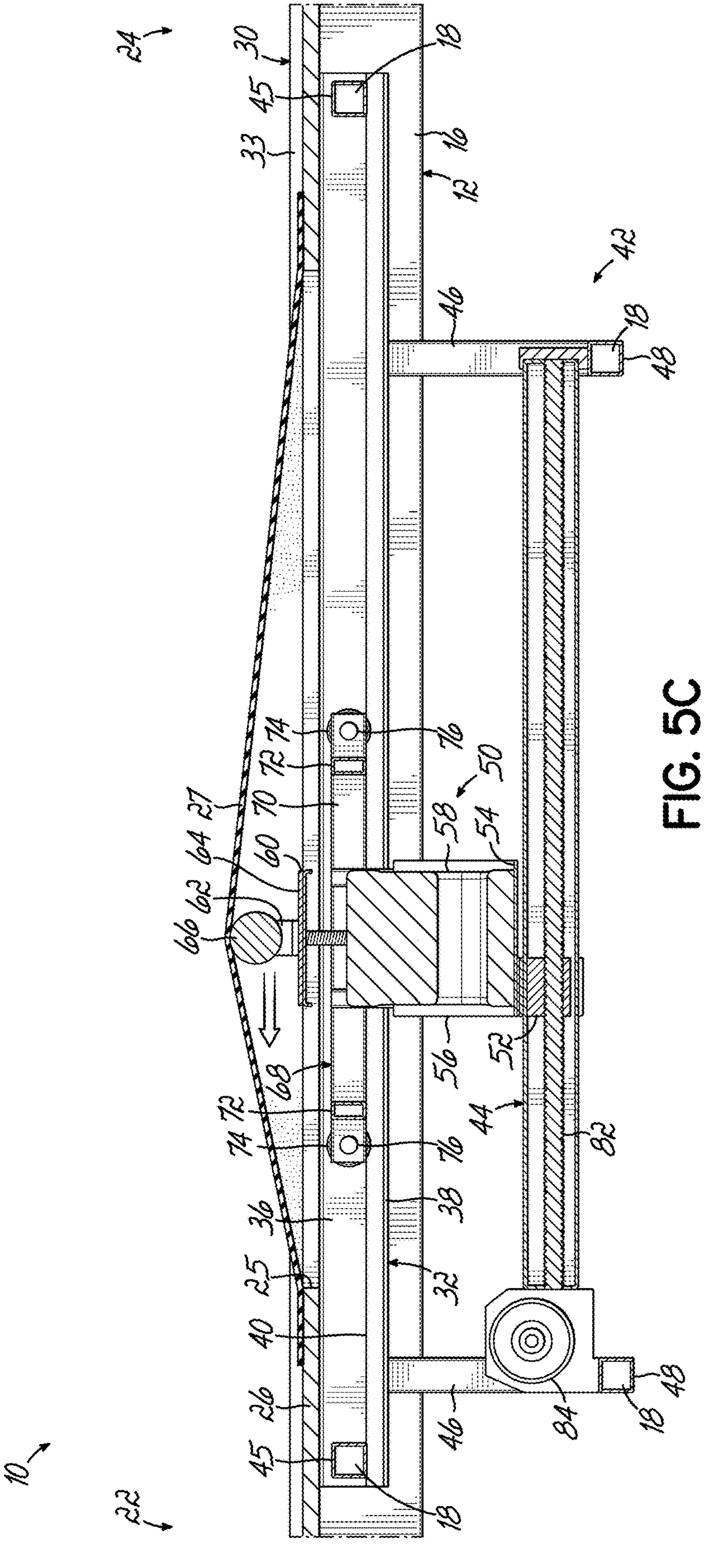
FIG. 5C is a cross-sectional view like FIG. 5 showing the roller in a raised position and moving forward from its position shown in FIG. 5A.

As best shown in FIG. 2, the rigid platform 26 has a rectangular opening 25 covered by a cover 27. The cover 27 may be secured to the rigid platform 26. The cover 27 may be made of any durable fabric which is elastic enough to stretch a bit as shown in FIGS. 5A-5C yet strong enough to withstand the pressure and friction caused by movement of the roller 66. Although the drawings illustrate a rectangular opening 25 of a certain size, the drawings are not intended to be limiting. The opening in the rigid platform may be any desired size and shape.

As best shown in FIG. 2, the bedding foundation 10 further comprises a lift mechanism 42 removably secured to the rigid platform 26. More particularly, the lift mechanism 42 is secured to the rigid platform 26 using two parallel roller rails 32 secured to the rigid platform 26 in any known manner including fasteners (not shown) passing through openings 35 in the roller rails 32 and through the rigid platform 26. See FIG. 3.

Figure 3:
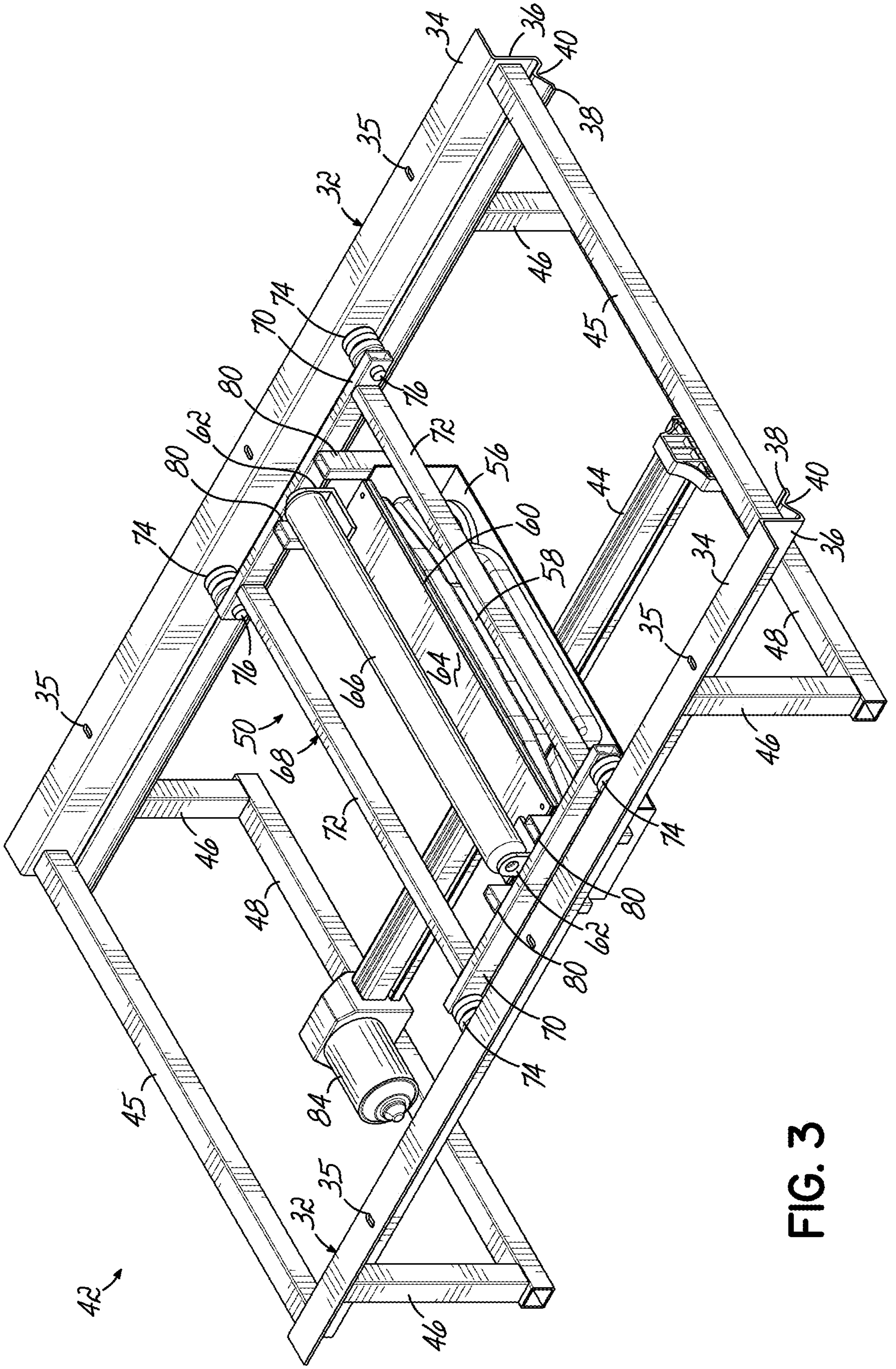
FIG. 3 is an enlarged perspective view of the lift mechanism of the bedding foundation of FIG. 1.

FIG. 3 illustrates a closer view of the lift mechanism 42. As best shown in FIG. 3, each roller rail 32 is a unitary member have a horizontally oriented mounting flange 34, a connecting portion 36 extending downwardly from an inner edge of the mounting flange 34 and an inverted V-shaped lower portion 38 extending inwardly from the lower edge of the connecting portion 36. The inverted V-shaped lower portion 38 has a rounded apex 40 which is the uppermost portion of the inverted V-shaped lower portion 38. Although one shape of roller rail is illustrated, the roller rail of the present invention may assume other shapes. Although each roller rail 32 is typically made of metal, it may be made of any desirable material. One purpose of the roller rails 32 is to guide movement of the movable roller carriage 50 described below. Although one type of interaction between the wheels of the roller carriage 50 and the roller rails 32 is illustrated, other know interactions are within the purview of the present invention.

As best shown in FIG. 3, the lift mechanism 42 of the bedding foundation 10 further comprises a pair of hollow stabilizers 45 welded or otherwise secured to the ends of the roller rails 32 of the lift mechanism 42 and extending therebetween. As best shown in FIG. 3, the lift mechanism 42 of the bedding foundation 10 further comprises a pair of hollow uprights 46 per side welded or otherwise secured to the roller rails 32 of the lift mechanism 42 and extending downwardly therefrom. The lift mechanism 42 further comprises two hollow cross members 48, each hollow cross member 48 extending between two hollow uprights 46. The two front uprights 46 have a hollow cross member 48 extending therebetween and the two rear uprights 46 have another hollow cross member 48 extending therebetween. The hollow cross members 48 may be welded or otherwise secured to the hollow uprights 46 in any conventional fashion. A motorized linear actuator 44 is secured to the hollow cross members 48 and extends therebetween, from front to back in the bedding foundation. Although any linear actuator may be used one that has proven satisfactory is a Richmat Item Number HJA61S available at http://www.richmat.com.

As best seen in FIG. 3, the linear actuator 44 moves a roller carriage 50 in a linear direction from front to back in the bedding foundation 10. As best seen in FIG. 5, the linear actuator 44 includes a bus 52 which is the part of the linear actuator 44 and moves linearly due to rotation of a threaded rod 82 rotated by a motor 84, which is conventional for a linear actuator. A roller tray bracket 54 is secured to the bus 52. The roller tray bracket 54 secures the linear actuator 44 to the roller carriage 50. As best seen in FIG. 4, the roller carriage 50 includes a roller tray 56 inside which is a lifter or lift actuator 58. As best seen in FIG. 6, the roller tray 56 has a generally U-shape cross-sectional configuration. Although any lift actuator may be used, one that has proven satisfactory is a Linak product Item number BASE1000A0F100100 available at http://www.linak.com.

The lifter 58 is secured in the roller tray 56 of the roller carriage 50 and functions to raise and lower a lifter plate 60. Two generally L-shaped roller mounting brackets 62 are secured to the upper surface 64 of the lifter plate 60. The lifter plate 60 is best shown in FIG. 3. A roller 66 extends between the generally L-shaped roller mounting brackets 62. The roller 66 is sized to fit through the opening 25 in the rigid platform 26.

As best shown in FIG. 3, the roller carriage 50 further comprises a chassis 68 comprising two hollow side members 70 and two hollow connecting members 72. Each hollow connecting member 72 extends between the hollow side members 70. As best shown in FIG. 3, the roller carriage 50 further comprises four wheels 74, each wheel 74 being rotatably mounted on a wheel pin 76. Each wheel pin 76 extends through at least a portion of one of the hollow side members 70 of the chassis 68 of the roller carriage 50. As best shown in FIG. 6, each wheel 74 has a groove 78 therein adapted to receive the rounded apex 40 of the inverted V-shaped lower portion 38 of one of the roller rails 32.

As best shown in FIG. 3, the chassis 68 of the roller carriage 50 further comprises four hollow stubs 80, two per side. Each hollow stub 80 is welded or otherwise secured at its upper end to one of the hollow side members 70 of the chassis 68 of the roller carriage 50 and is welded or otherwise secured at its lower end to the roller tray 56 of the roller carriage 50.

FIGS. 5A-5C illustrate the method of providing a massaging feeling to a mattress using a lift mechanism 42 built into a bedding foundation 10. FIG. 5A illustrates the roller 66 in its lowered or down position as determined by the lifter 58. The position of roller carriage 50 and its roller 66 is further determined by the position of the bus 52 of the linear actuator 44. The linear actuator 44 and the lifter 58 may be controlled remotely (wirelessly) or via a wired connection.

FIG. 5B illustrates the roller carriage 50 being moved rearwardly from its position shown in FIG. 5A with the roller 66 in its raised or up position as determined by the lifter 58. The roller carriage 50 may continue to move rearwardly until the bus 52 of the linear actuator 44 reaches the back end of the threaded rod 82 of the linear actuator 44.

FIG. 5C illustrates the roller carriage 50 being moved forwardly from its position shown in FIG. 5B, the roller 66 remaining in its raised or up position as determined by the lifter 58. The roller carriage 50 may continue to move forwardly until the bus 52 of the linear actuator 44 reaches the front end of the threaded rod 82 of the linear actuator 44. During either forward or rearward movement of the roller carriage 50, the grooved wheels 74 move along the roller rails 32 of the lift mechanism 42. As best shown in FIG. 6, the rounded apex 40 of each roller rail 32 remains in the groove 78 of each wheel 74 during movement of the roller carriage 50, regardless of the vertical position of the roller 60.

Figure 7A:
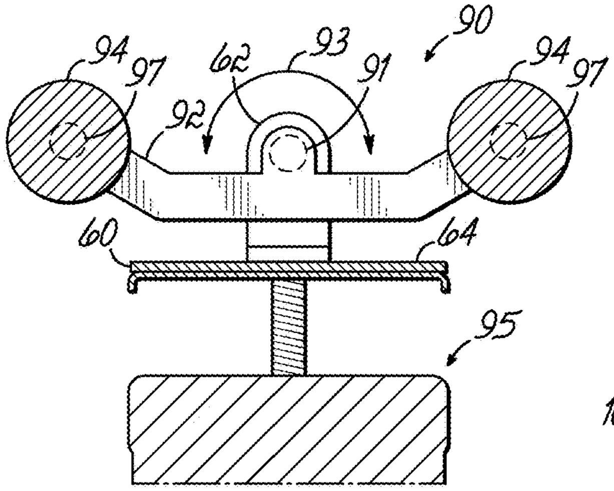
FIG. 7A is a schematic cross-sectional view of another embodiment of massager which may be substituted for a single roller.

FIG. 7A illustrates another embodiment of massager 90 which may be used in a lift mechanism 95, like lift mechanism 42 shown and described herein. As in lift mechanism 42, lift mechanism 95 comprises two generally L-shaped roller mounting brackets 62 (only one shown in FIG. 7A) secured to the upper surface 64 of the lifter plate 60. Instead of a roller extending between the generally L-shaped roller mounting brackets 62, a rocker bar 91 extends between the generally L-shaped roller mounting brackets 62. A rocker 92 pivots about the rocker 92 as shown by arrow 93. A roller 94 is attached to each end of the rocker 92 and is rotatable about a bar 97. The rocker 92 is sized to fit through the opening 25 in the rigid platform 26. Thus, the lift mechanism 95 has two rollers 94, each circular in cross-section. However, the rollers may have any desired cross-sectional configuration. The rollers 92 may be rotatable or not.

Figure 7B:
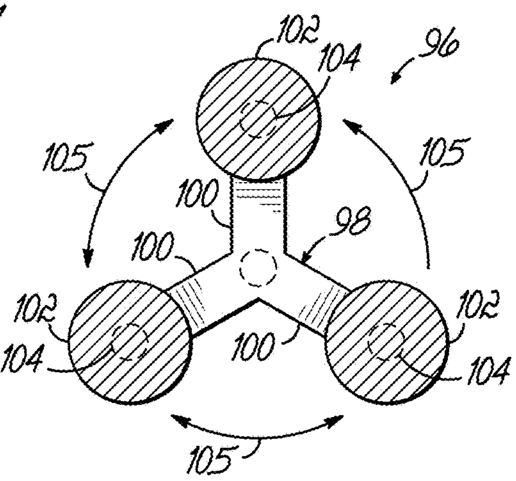
FIG. 7B is a schematic cross-sectional view of another embodiment of massager which may be substituted for a single roller.

FIG. 7B illustrates another embodiment of massager 96 which may be used in any lift mechanism shown and described herein. Massager 96 comprises a rotatable brace 98 having three arms 100. A rotatable roller 102 is mounted at the end of each arm 100 of rotatable brace 98 and is rotatable about a bar 104. As indicated by arrows 105, the rotatable brace 98 may rotate either clockwise or counter-clockwise.

Figure 7C:
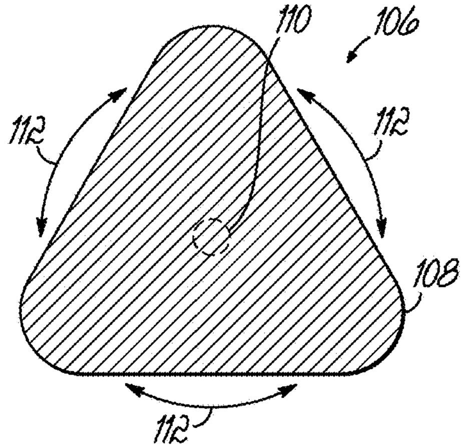
FIG. 7C is a schematic cross-sectional view of another embodiment of massager which may be substituted for a single roller having a round cross-section.

FIG. 7C illustrates another embodiment of massager 106 which may be used in any lift mechanism shown and described herein. Massager 106 comprises a rotatable generally triangular member 108 which is rotatable about a bar 110. As indicated by arrows 112, the rotatable member 108 may rotate either clockwise or counter-clockwise. The rotatable member 108 may take the place of roller 66 in the principal embodiment described herein.

Figure 7D:
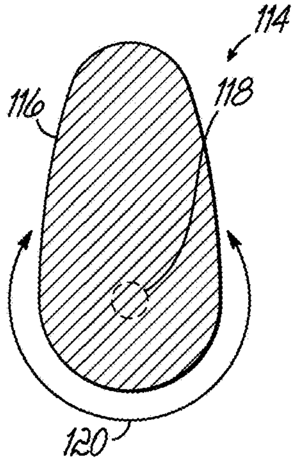
FIG. 7D is a schematic cross-sectional view of another embodiment of massager which may be substituted for a single roller having a round cross-section.

FIG. 7D illustrates another embodiment of massager 114 which may be used in any lift mechanism shown and described herein. Massager 114 comprises a rotatable generally oval shaped member 116 which is rotatable about a bar 118. As indicated by arrow 120, the rotatable oval shaped member 116 may rotate either clockwise or counter-clockwise. The rotatable oval shaped member 116 may take the place of roller 66 in the principal embodiment described herein.

Figure 7E:
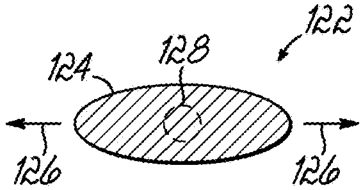
FIG. 7E is a schematic cross-sectional view of another embodiment of massager which may be substituted for a single rotatable roller having a round cross-section.

FIG. 7E illustrates another embodiment of massager 122 which may be used in any lift mechanism shown and described herein. Massager 122 comprises a non-rotatable generally oval shaped member 124 which is movable in a linear direction as indicated by arrows 126. The non-rotatable generally oval shaped member 124 is mounted on a bar 128. The non-rotatable generally oval shaped member 124 may take the place of roller 66 in the principal embodiment described herein.

Figure 7F:
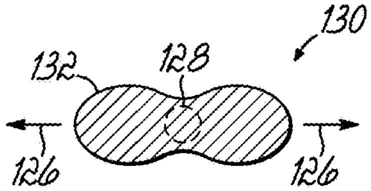
FIG. 7F is a schematic cross-sectional view of another embodiment of massager which may be substituted for a single rotatable roller having a round cross-section.

FIG. 7F illustrates another embodiment of massager 130 which may be used in any lift mechanism shown and described herein. Massager 130 comprises a non-rotatable generally peanut shaped member 132 which is movable in a linear direction as indicated by arrows 126. The non-rotatable generally peanut shaped member 132 is mounted on a bar 128. The non-rotatable generally peanut shaped member 132 may take the place of roller 66 in the principal embodiment described herein.

Figure 7G:
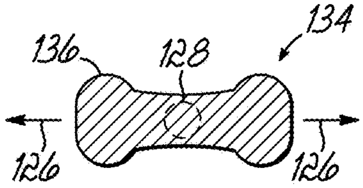
FIG. 7G is a schematic cross-sectional view of another embodiment of massager which may be substituted for a single rotatable roller having a round cross-section.

FIG. 7G illustrates another embodiment of massager 134 which may be used in any lift mechanism shown and described herein. Massager 134 comprises a non-rotatable generally dog bone shaped member 136 which is movable in a linear direction as indicated by arrows 126. The non-rotatable generally dog bone shaped member 136 is mounted on a bar 128. The non-rotatable generally dog bone shaped member 136 may take the place of roller 66 in the principal embodiment described herein.

Figure 8A:
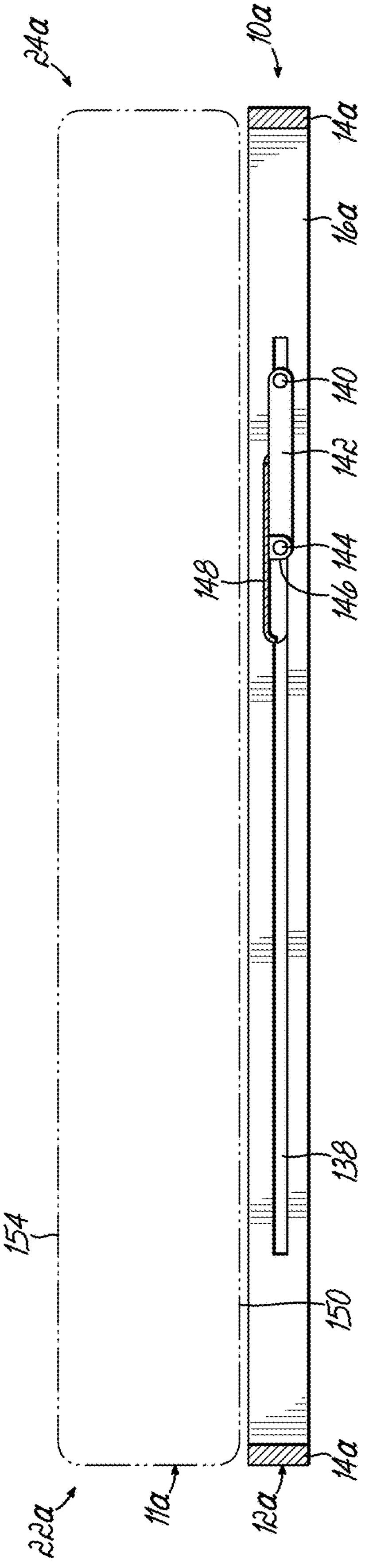
FIG. 8A is a schematic cross-sectional view of another embodiment of bedding foundation.
Figure 8B:
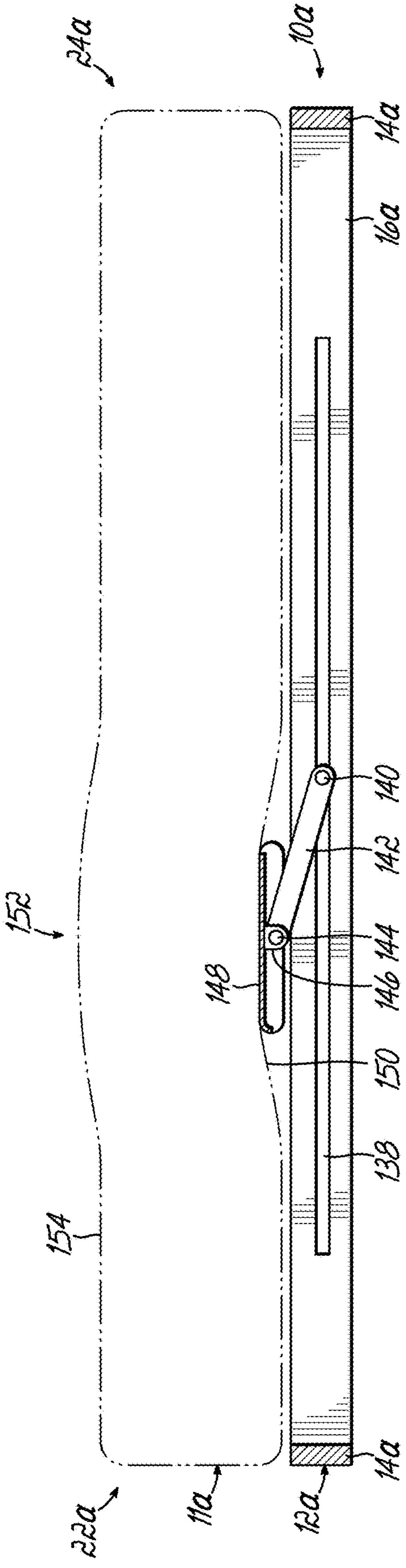
FIG. 8B is a schematic cross-sectional view of the embodiment of bedding foundation of FIG. 8A showing a massager in a raised position.

FIGS. 8A and 8B illustrate the operation of another embodiment of bedding foundation 10*a* with a mattress 11*a* shown above the bedding foundation 10*a*. Bedding foundation 10*a* comprises a generally rectangular frame 12*a* comprising two end rails 14*a* and two side rails 16*a*, only one being shown. Although not shown, legs may support the rectangular frame 12*a* above the ground a desired distance.

As best shown in FIG. 8B, each side rail 16*a* (only one being shown) has a linear slot 138 cut therein. A first pin 140 moves inside the linear slots 138 of the side rails 16*a* and extends therebetween. A lever 142 extends from the first pin 140 to a second pin 144 which extends between two bosses 146 of a platform 148. The platform 148 moves between a lowered position shown in FIG. 8A and a raised position shown in FIG. 8B in any known manner. When the platform 148 is in its raised position, it exerts an upward force on the lower surface 150 of mattress 11*a* causing a bump or raised portion 152 in the upper surface 154 of mattress 11*a*, as shown in FIG. 8B. As shown in FIG. 8A, when the platform 148 is in its lowered position, the platform 148 does not exert any upward force on the mattress 11*a* and upper surface of the mattress 11*a* is generally planar.

For purposes of this document, the head end of the bedding foundation 10*a* will be indicated by the numeral 22*a* while the foot end of the bedding foundation 10*a* will be indicated by the numeral 24*a*. FIG. 8B shows the platform 148 upstream from its position shown in FIG. 8B due to movement of the first pin 140. When the first pin 140 is in any position including positions not shown, the lever 142 may be raised to raise the second pin 144, bosses 146 and platform 148. The drawings are not intended to be limiting. The first pin 140 may be moved upstream or downstream regardless of the position of the lever 142, second pin 144 and platform 146. Similarly, the platform 146 may be raised and lowered regardless of the position of the first pin 140.

Figure 9A:
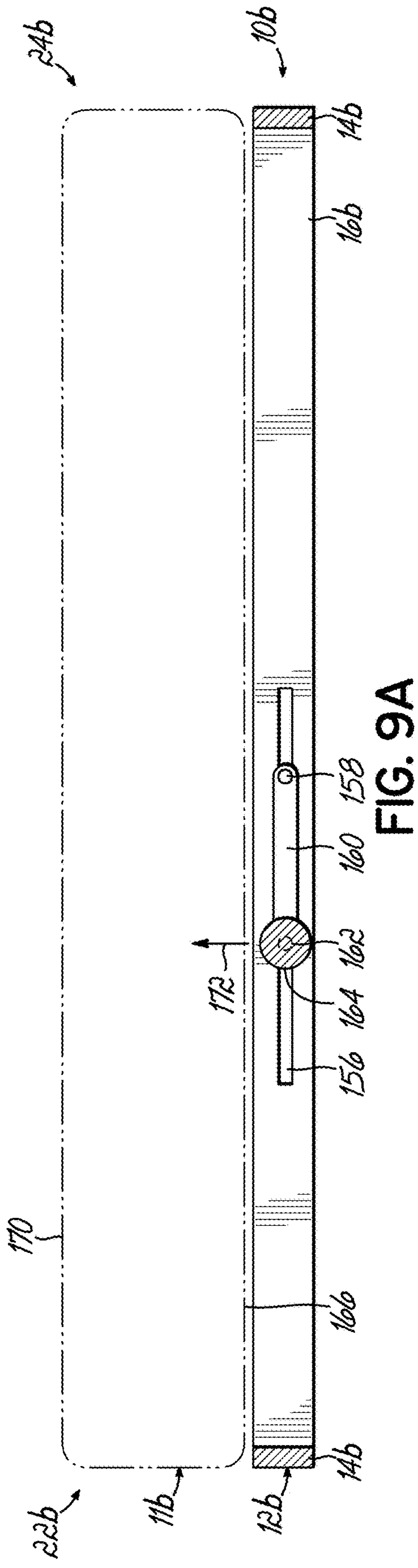
FIG. 9A is a schematic cross-sectional view of another embodiment of bedding foundation.
Figure 9B:
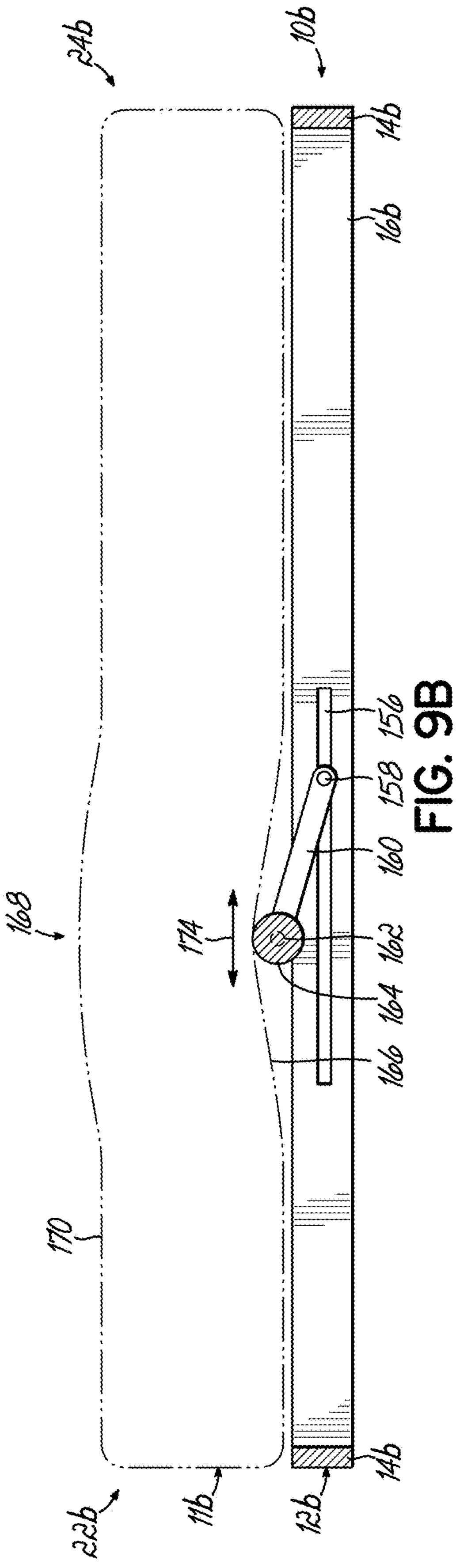
FIG. 9B is a schematic cross-sectional view of the embodiment of bedding foundation of FIG. 9A showing a massager in a raised position.

FIGS. 9A and 9B illustrate the operation of another embodiment of bedding foundation 10*b* with a mattress 11*b* shown above the bedding foundation 10*b*. Bedding foundation 10*b* comprises a generally rectangular frame 12*b* comprising two end rails 14*b* and two side rails 16*b*, only one being shown. Although not shown, legs may support the rectangular frame 12*b* above the ground a desired distance.

As best shown in FIG. 9B, each side rail 16*b* (only one being shown) has a linear slot 156 cut therein. A first pin 158 moves inside the linear slots 156 of the side rails 16*b* and extends therebetween. A lever 160 extends from the first pin 158 to a second pin 162. A roller 164 surrounds the second pin 162. The roller 164 may be rotatable or not. The roller 164 moves between a lowered position shown in FIG. 9A and a raised position shown in FIG. 9B in any known manner. When the roller 164 is in its raised position, the roller 164 exerts an upward force on the lower surface 166 of mattress 11*b* causing a bump or raised portion 168 in the upper surface 170 of mattress 11*b*, as shown in FIG. 9B. As shown in FIG. 9A, when the roller 164 is in its lowered position, the roller 164 does not exert any upward force on the mattress 11*a* and upper surface 170 of the mattress 11*b* is generally planar.

For purposes of this document, the head end of the bedding foundation 10*b* will be indicated by the numeral 22*b* while the foot end of the bedding foundation 10*b* will be indicated by the numeral 24*b*. FIG. 9B shows the roller 164 downstream from its position shown in FIG. 9B due to movement of the lever 160, the first pin 158 remaining in the same position. When the first pin 158 is in any position including positions not shown, the lever 160 may be raised to raise the second pin 162 and roller 164. The drawings are not intended to be limiting.

As shown in FIG. 9A, the roller 164 may be raised in the direction of arrow 172 by the lever 160 pivoting about first pin 158 by any known mechanism. When the roller 164 is in a raised position (shown or not shown), the first pin 158 may be moved upstream or downstream as shown by the arrow 174. The first pin 158 may be moved upstream or downstream regardless of the position of the lever 160, second pin 162 and roller 164. Similarly, the roller 164 may be raised and lowered regardless of the position of the first pin 158.

Figure 10A:
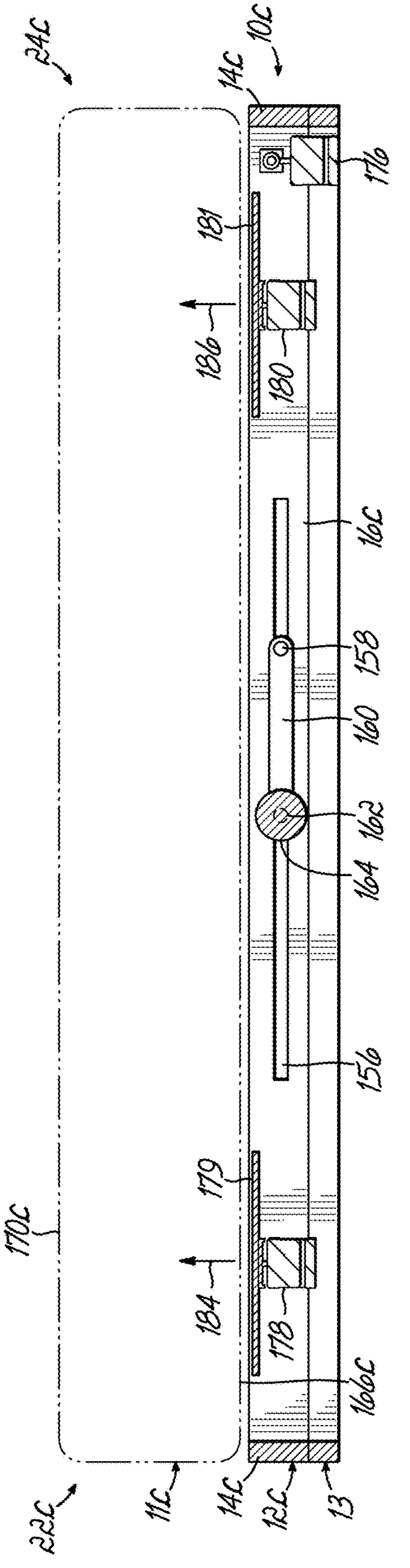
FIG. 10A is a schematic cross-sectional view of another embodiment of bedding foundation.
Figure 10B:
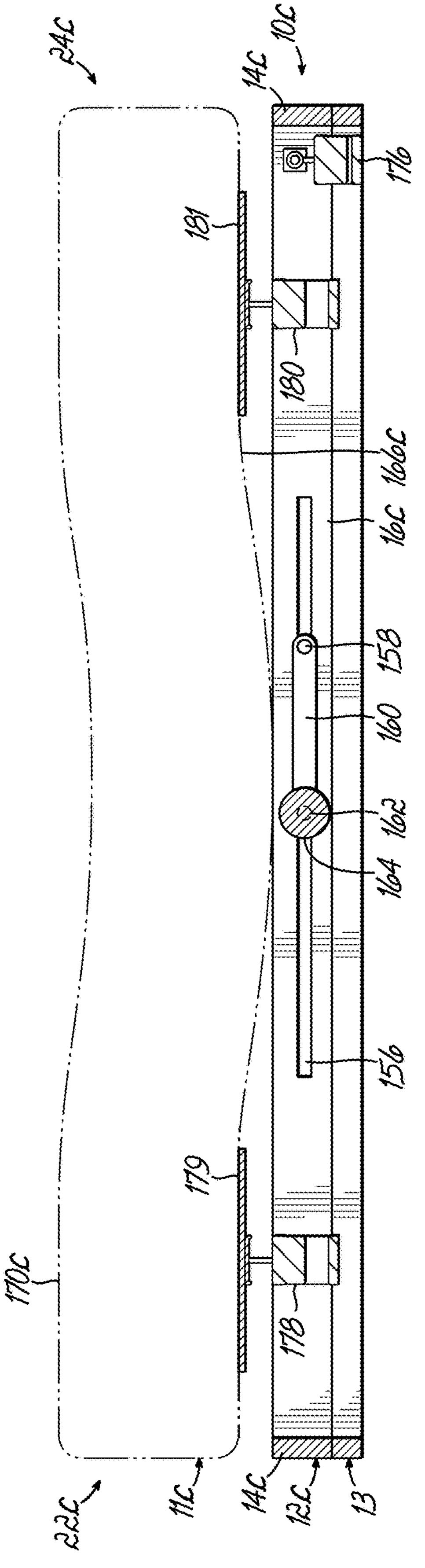
FIG. 10B is a schematic cross-sectional view of the embodiment of bedding foundation of FIG. 10A showing lifters on opposite sides of a massager, the lifters being raised to a raised position.
Figure 10C:
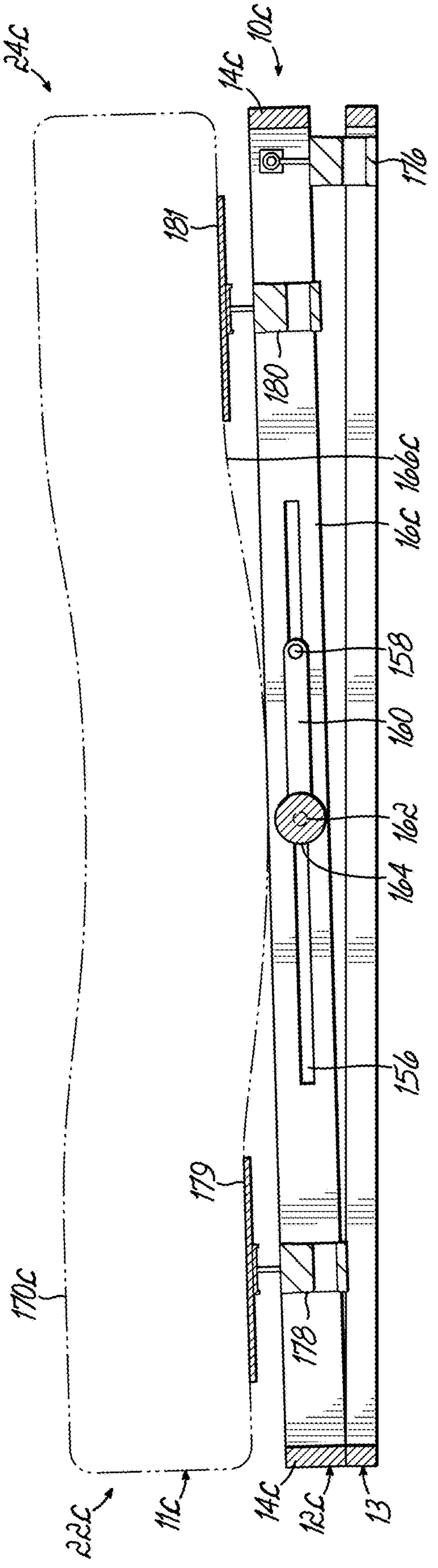
FIG. 10C is a schematic cross-sectional view of the embodiment of bedding foundation of FIG. 10A showing the lifters being in a raised position and the frame being inclined.

FIGS. 10A-10C illustrate the operation of another embodiment of bedding foundation 10*c* with a mattress 11*c* shown above the bedding foundation 10*c*. For purposes of this document, the head end of the bedding foundation 10*c* will be indicated by the numeral 22*c* while the foot end of the bedding foundation 10*c* will be indicated by the numeral 24*c*.

Bedding foundation 10*c* comprises a generally rectangular frame 12*c* comprising two end rails 14*c* and two side rails 16*c*, only one being shown. Although not shown, legs may support the rectangular frame 12*c* above the ground a desired distance. The generally rectangular frame 12*c* is shown resting on a generally rectangular base 13 which is stationary regardless of the position of the generally rectangular frame 12*c*.

The generally rectangular frame 12*c* is movable between a lowered position shown in FIGS. 10A and 10B and an inclined position shown in FIG. 10C via operation of a lift mechanism 176. Although FIGS. 10A-10C illustrate the lift mechanism 176 proximate the foot end 24c of the bedding foundation 10c, another lift mechanism (not shown) may be located at the head end 22c of the bedding foundation 10c to incline the head end 22c of the bedding foundation 10c. As illustrated in FIG. 10C, the lift mechanism 176 inclines the foot end 24c of the bedding foundation 10c relative to the head end 22c of the bedding foundation 10c.

As best shown in FIG. 10A, each side rail 16b (only one being shown) has a linear slot 156 cut therein. A first pin 158 moves inside the linear slots 156 of the side rails 16c and extends therebetween. A lever 160 extends from the first pin 158 to a second pin 162. A roller 164 surrounds the second pin 162. The roller 164 may be rotatable or not. The roller 164 moves between a lowered position shown in FIG. 9A and a raised position shown in FIG. 9B in any known manner. FIGS. 10A-10C show the roller 164 in a lowered position. When the roller 164 is in its raised position, the roller 164 exerts an upward force on the lower surface 166c of mattress 11c causing a bump or raised portion (not shown) in the upper surface 170c of mattress 11c, like shown in the mattress 11b of FIG. 9B. As shown in FIG. 10A, when the roller 164 is in its lowered position, the roller 164 does not exert any upward force on the mattress 11c and upper surface 170c of the mattress 11c is generally planar.

FIG. 10A shows a front lift actuator 178 in front of the roller 164 and a rear lift actuator 180 located behind the roller 164. A front platform 179 is secured to the top of the front lift actuator 178 and a rear platform 181 is secured to the top of the rear lift actuator 180. The front lift actuator 178 moves the front platform 179 between a lowered position shown in FIG. 10A and a raised position shown in FIGS. 10B and 10C. The rear lift actuator 180 moves the rear platform 181 between a lowered position shown in FIG. 10A and a raised position shown in FIGS. 10B and 10C. The front lift actuator 178 is operated independently from the rear lift actuator 180 although each drawing shows them in the same position. For example, the front lift actuator 178 may be in a raised position while the rear lift actuator 180 is in a lowered position.

The front lift actuator 178 may be raised and lowered regardless of the position of the roller 164. Similarly, the rear lift actuator 180 may be raised and lowered regardless of the position of the roller 164.

As shown by the arrow 184 shown in FIG. 10A, when the front lift actuator 178 is activated and the front platform 179 raised, the upper surface 170c of mattress 11c is raised at the front of the mattress 11c. As shown by the arrow 186 shown in FIG. 10A, when the rear lift actuator 180 is activated and the rear platform 181 raised, the upper surface 170c of mattress 11c is raised at the rear of the mattress 11c.

Figure 11:
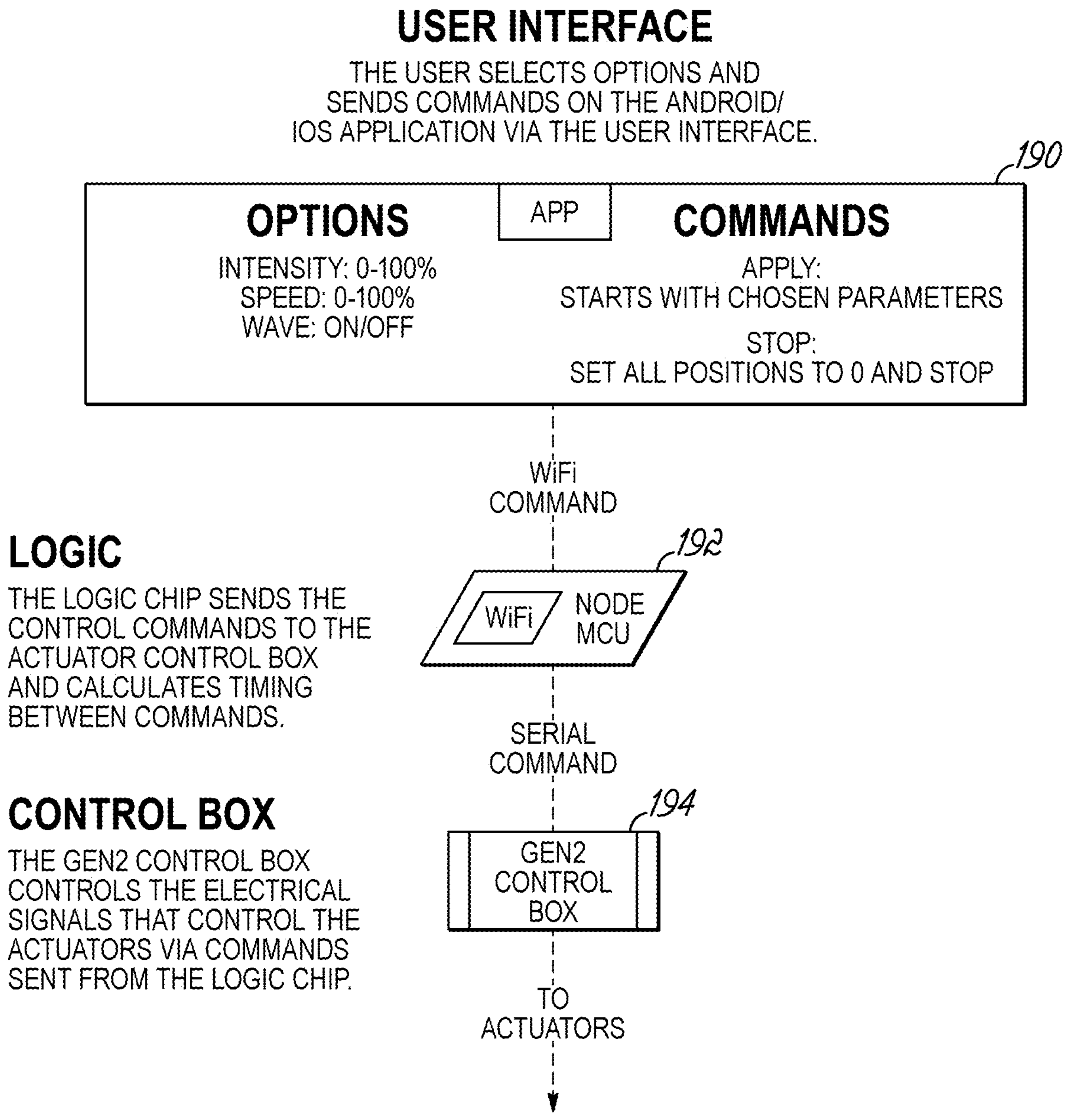
FIG. 11 is a flow chart showing the operation of one embodiment of the present invention.

FIG. 11 illustrates a flow chart showing the general operation of an adjustable bed in accordance with the present invention. FIG. 11 shows a user interface 190 such as an application on a mobile phone. An operator may manipulate the user interface to select an intensity of massage from zero to one hundred percent. The percentage of intensity chosen determines the height of the roller and thus the upward force exerted on the mattress above the adjustable bed. An operator may further manipulate the user interface to select a speed of travel of the roller from zero to one hundred percent. The percentage of speed chosen determines the speed of travel of the roller and thus the massage feeling exerted on the mattress above the adjustable bed. An operator may further turn a wave action on or off using the user interface 190.

Figure 12:
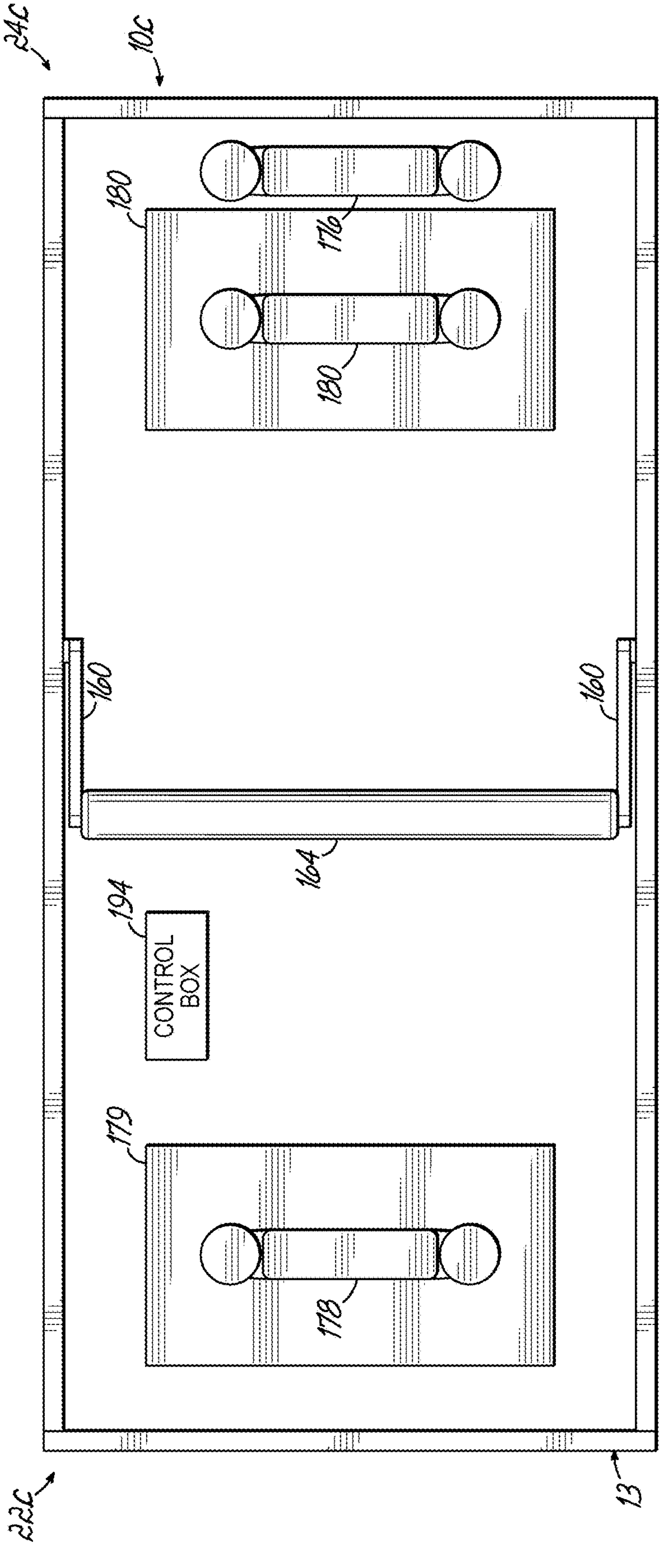
FIG. 12 is a bottom view of a bedding foundation in accordance with the present invention.

A logic chip sends the control commands to an actuator control box 192 and calculates the timing between commands. A logic chip 192 receives a Wi-Fi command from the user interface and issues a command to a control box 194. The control box 194 controls the electrical signals that control the actuators via commands sent from the logic chip. Although FIG. 12 shows the control box at a specific location, it may be located at any desired location.

Figure 13:
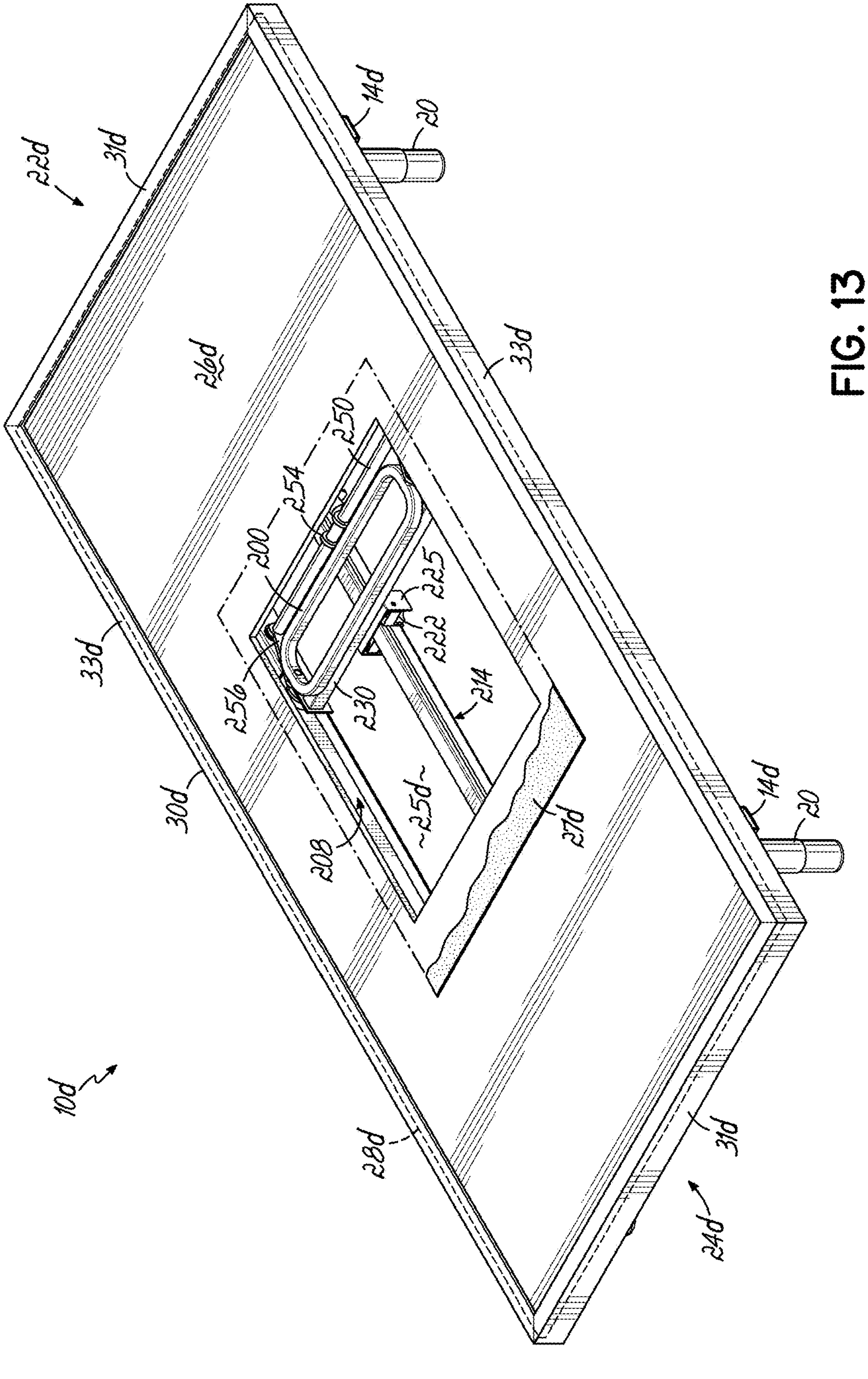
FIG. 13 is a top perspective view of another embodiment of bedding foundation.
Figure 14:
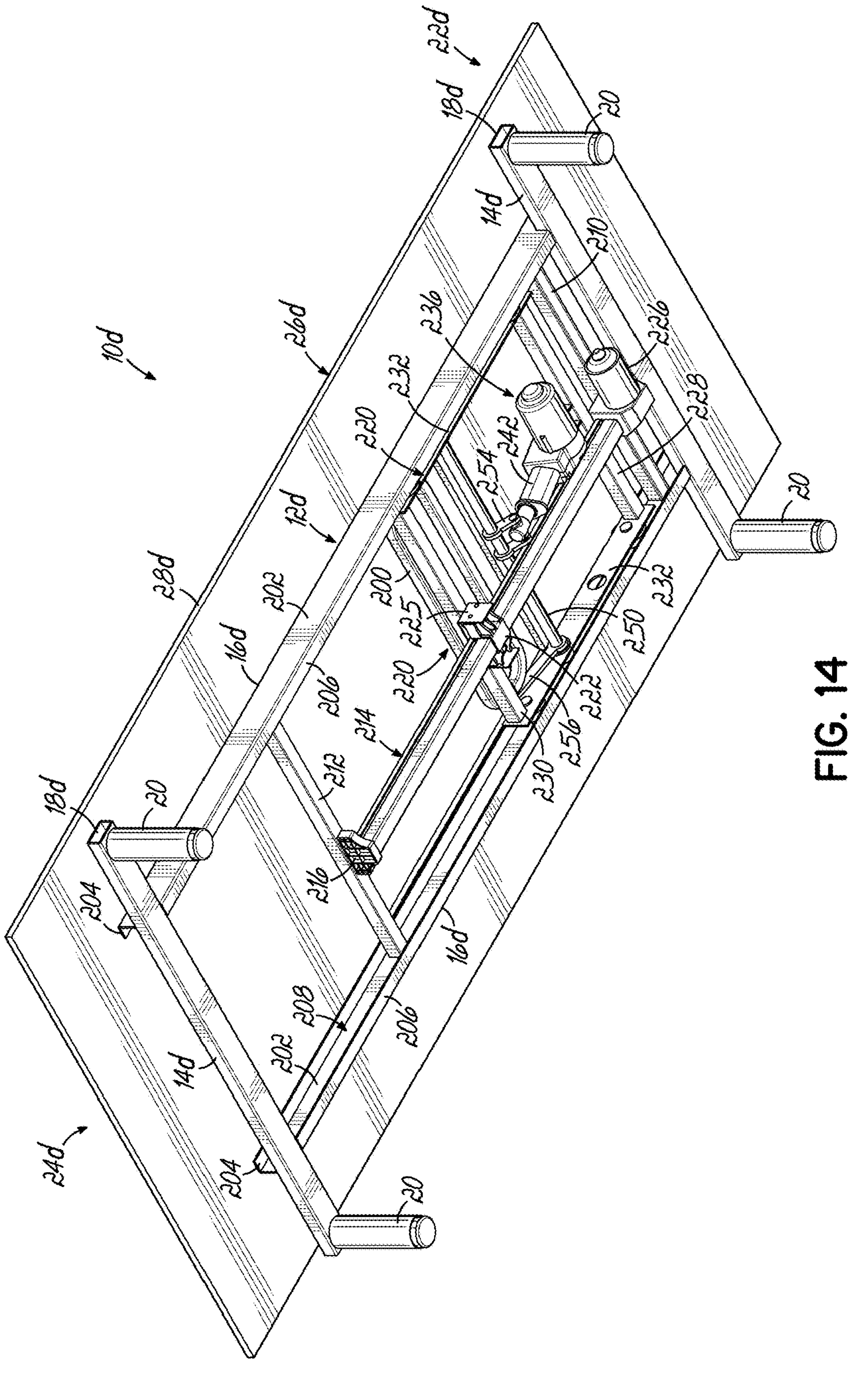
FIG. 14 is a bottom perspective view of the bedding foundation of FIG. 13.
Figure 15:
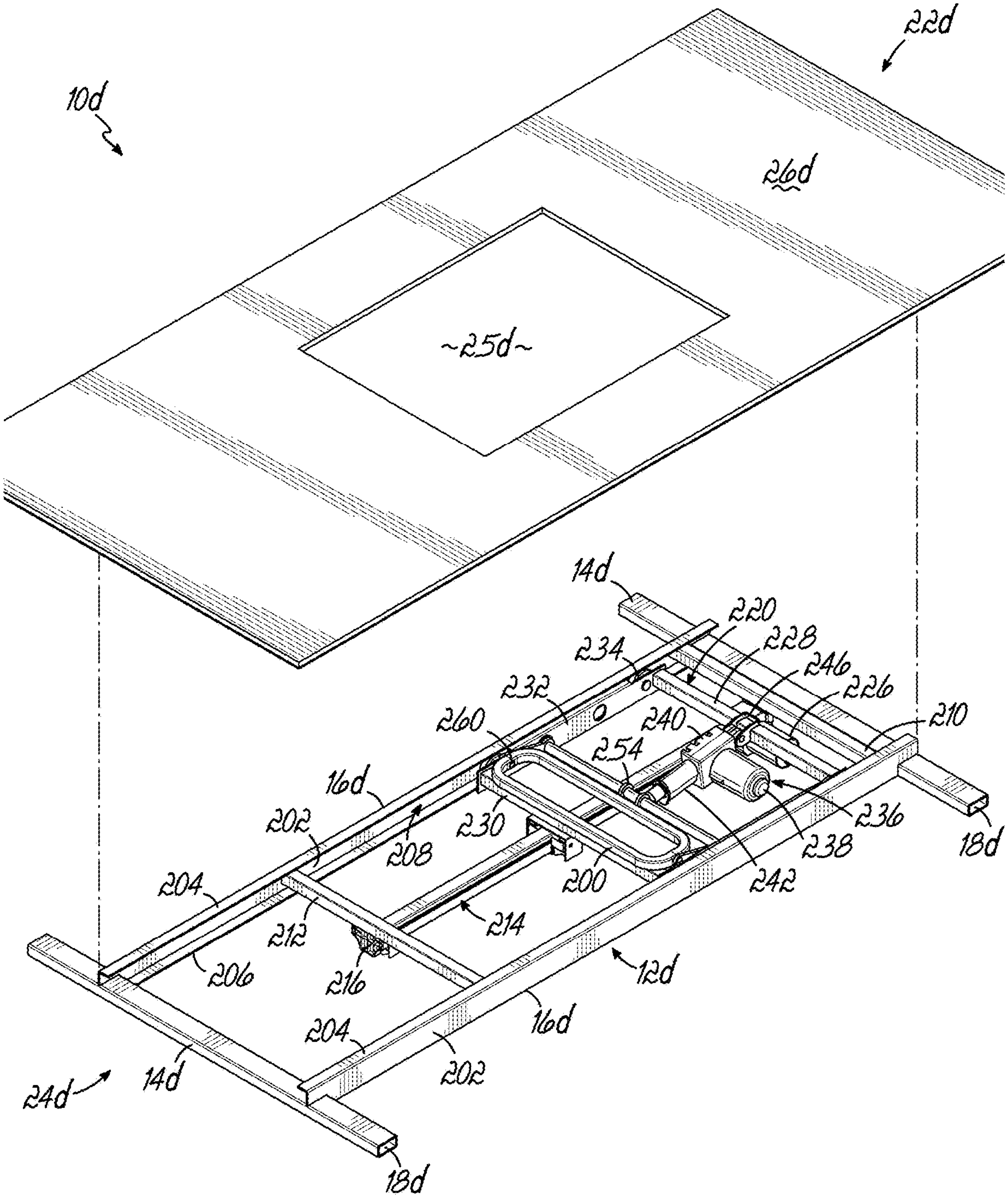
FIG. 15 is a partially disassembled view of the bedding foundation of FIG. 13.
Figure 15A:
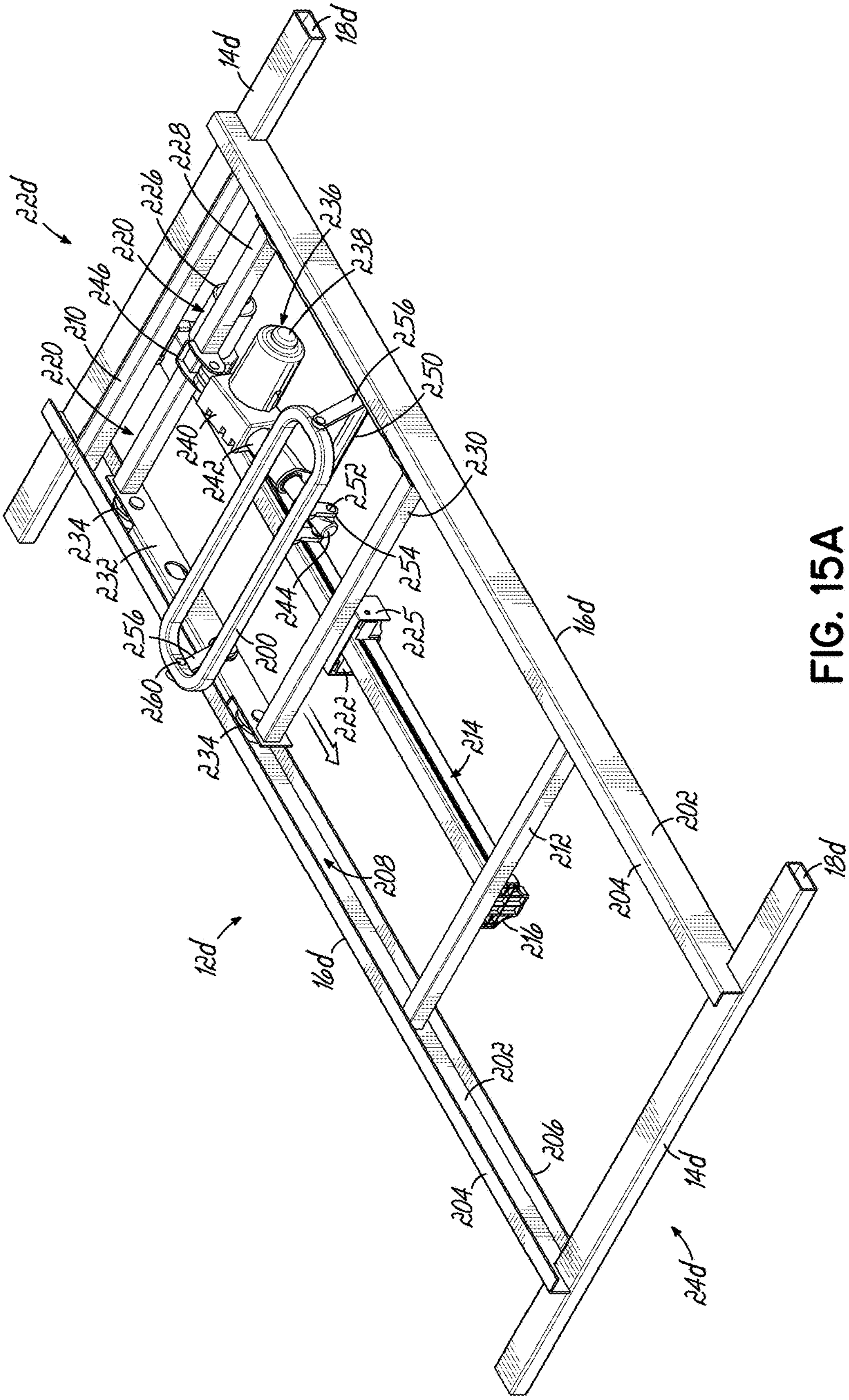
FIG. 15A is a top perspective view of a portion of the bedding foundation of FIG. 13.

FIGS. 13-16E illustrate another embodiment of bedding foundation 10d and its method of use. As best shown in FIG. 14, the bedding foundation 10d comprises a generally rectangular frame 12d, comprising two end rails 14d and two side rails 16d. As best shown in FIG. 14, the end and side rails 14d, 16d may be secured together with any conventional means, including fasteners. As best shown in FIGS. 14, 15 and 15A, each of the end rails 14d has a hollow interior 18d.

Legs 20 support the rectangular frame 12d above the ground a desired distance. Although the legs 20 are illustrated being secured to the end rails 14d, they may be secured to any part of the generally rectangular frame 12d.

For purposes of this document, the head end of the bedding foundation 10d will be indicated by the numeral 22d while the foot end of the bedding foundation 10d will be indicated by the numeral 24d.

As best shown in FIG. 13, a rigid platform 26d is secured to the generally rectangular frame 12d in any known manner. As best shown in FIGS. 14 and 15, the rigid platform 26d has a larger footprint than the generally rectangular frame 12d and extends outwardly from the perimeter of the generally rectangular frame 12d on all four sides. As best shown in FIG. 14, the rigid platform 26d has a perimeter edge 28d about which is placed a protective shroud 30d. As best shown in FIG. 14, the protective shroud 30 comprises four pieces joined together at the corners using any known method: two end pieces 31d of the same length and two side pieces 33d of a different, greater length.

The rigid platform 26d is typically made of wood but may be made of any known material. The protective shroud 30d may be made of rubber, plastic, or any soft material. One purpose of the protective shroud 30d to protect users from contacting the perimeter edge 28d of the rigid platform 26d to prevent injuries.

As best shown in FIG. 15, the rigid platform 26d has a rectangular opening 25d covered by a cover 27d. The cover 27d may be secured to the rigid platform 26d. The cover 27d may be made of any durable fabric which is elastic enough to stretch a bit as shown in FIGS. 16A-16E yet strong enough to withstand the pressure and friction caused by movement of the massager 200. Although the drawings illustrate a rectangular opening 25d of a certain size, the drawings are not intended to be limiting. The opening in the rigid platform may be any desired size and shape.

As best shown in FIG. 14, each of the side rails 16d of the generally rectangular frame 12d is generally C-shaped in cross-section. Each side rail 16d has a side wall portion 202, an upper wall portion 204 and a lower wall portion 206. The upper and lower wall portions 204, 206 are parallel and each extends inwardly from the side wall portion 202. The side wall portion 202 and upper and lower wall portions 204, 206 define a channel 208 adapted to receive wheels of a movable carriage as described below.

As best shown in FIG. 15A, bedding foundation 10d further comprises hollow front and rear cross members 210 and 212, respectively. The hollow front and rear cross members 210 and 212 provide anchors which support a motorized linear actuator 214. As best shown in FIG. 15A, a rear mounting bracket 216 is secured to the rear cross member 212. As best shown in FIG. 16A-16E, the motorized linear actuator 214 is secured to the front cross member 210 with fasteners 218. The motorized linear actuator 214 extends between the front cross member 210 and rear mounting bracket 216.

As best seen in FIG. 15A, the motorized linear actuator 214 moves a movable carriage 220 in a linear direction from front to back in the bedding foundation 10*d*. As best seen in FIGS. 15A, the motorized linear actuator 214 includes a bus 222 which is the part of the linear actuator 214 and moves linearly due to rotation of a threaded rod 224 rotated by an actuator motor 226, which is conventional for a linear actuator. As best shown in FIG. 15A, a generally U-shaped carriage bracket 225 is secured to the bus 222. The generally U-shaped carriage bracket 225 secures the linear actuator 214 to the movable carriage 220, as best shown in FIG. 15A. More specifically, a rear member 230 of the movable carriage 220 is secured to the generally U-shaped carriage bracket 225.

As best seen in FIG. 15A, the movable carriage 220 includes a front carriage member 228, a rear carriage member 230, and two side plates 232 extending between front and rear carriage members 228, 230, respectively. The movable carriage 220 further comprises four wheels 234, two per side, rotationally secured to the side plates 232 of the movable carriage 220. The wheels 234 of the movable carriage 220 are adapted to ride along the channels 208 of the side rails 16*d* of the generally rectangular frame 12*d* to guide movement of the movable carriage 220.

The movable carriage 220 further comprises a lift motor assembly 236 movable with the movable carriage 220. The lift motor assembly 236 comprises a lift motor 238, a lift motor housing 240, a cylinder 242 and a piston 244 movable relative to the cylinder 242. As best shown in FIG. 15A, a pin 252 extends through the piston 244 and defines another pivot axis. As best shown in FIG. 15A, the lift motor housing 240 is pivotally secured to a front support bracket 246 and pivots about axis 248. The front support bracket 246 is preferably welded to the front carriage member 228 but may be secured thereto in any known manner.

The movable carriage 220 further comprises a pivotal torque tube 250 extending between and supported by opposed side plates 232. As best shown in FIG. 14, two spaced arms 254 extend between the pivotal torque tube 250 and the pin 252 at the end of piston 244. Each of these arms 254 is welded or secured to the pivotal torque tube 250 at one end and welded or otherwise secured to the pin 252 at the other end.

The movable carriage 220 further comprises an oval-shaped massager 200 which is raised and lowered by pivotal movement of the torque tube 250 caused by activation of the lift motor 238. The massager 200 of adjustable bed 10*d* is shown as being oval-shaped but may be any other desired shape. The massager 200 is movable between a raised position and a lowered position by two links 256. Each link 256 is pivotally secured at its upper end at location 260 to massager 200 and welded or otherwise secured at its lower end to pivotal torque tube 250.

Figure 16A:
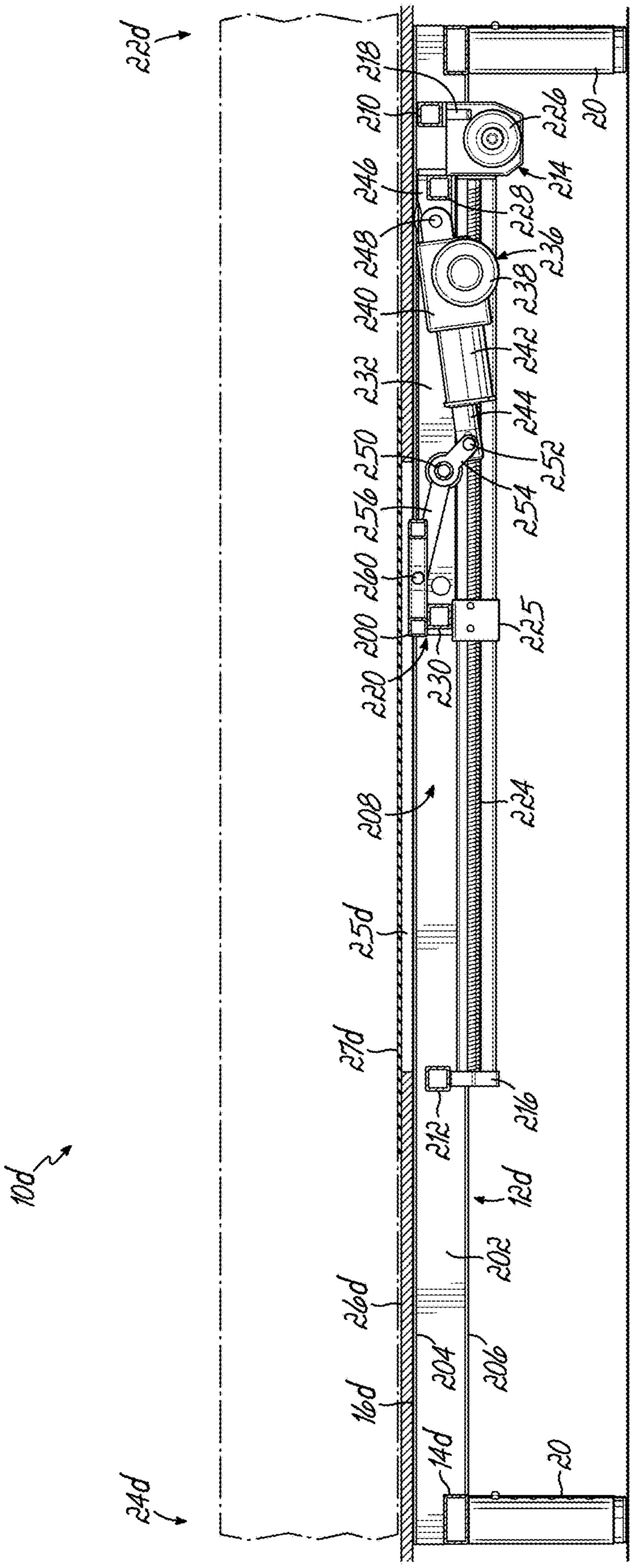
FIG. 16A is a schematic cross-sectional view of the bedding foundation of FIG. 13 with the movable carriage in its home position and the massager in its lowered position.
Figure 16B:
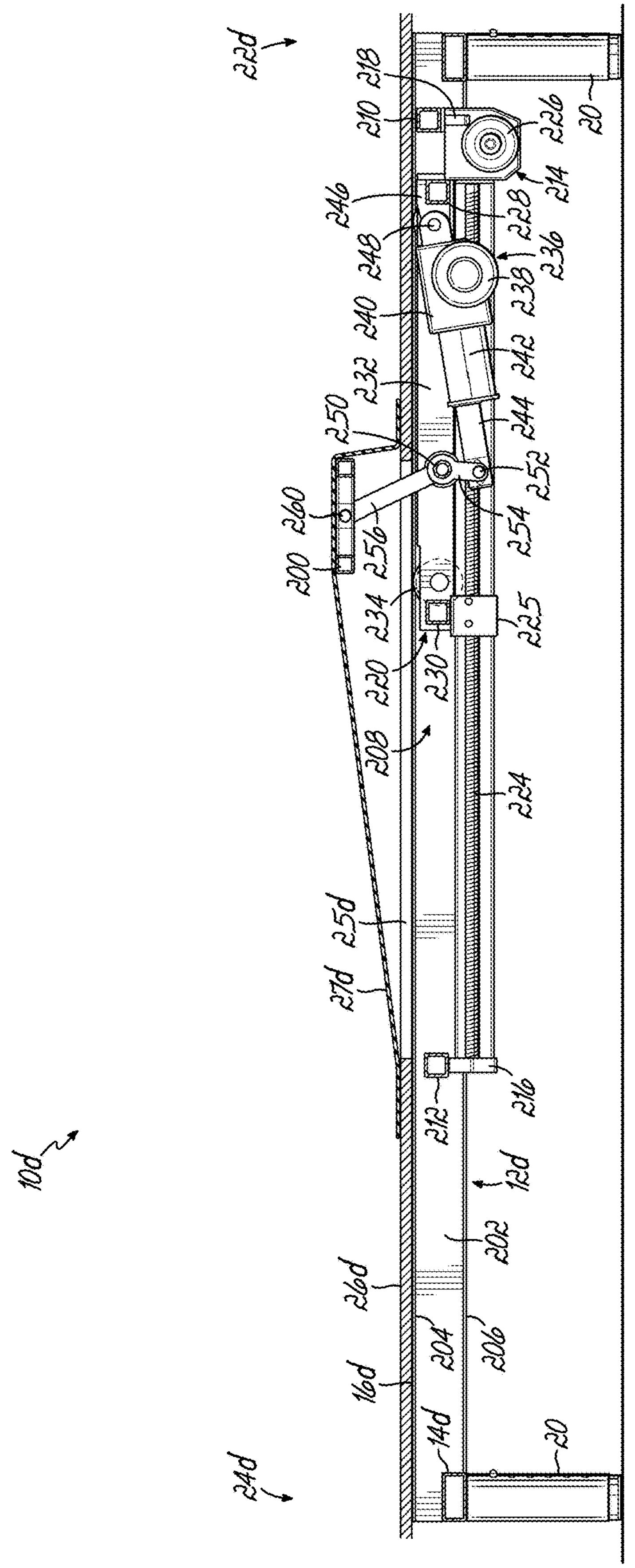
FIG. 16B is a schematic cross-sectional view of the bedding foundation of FIG. 13 with the movable carriage in its home position showing the massager in a raised position.
Figure 16C:
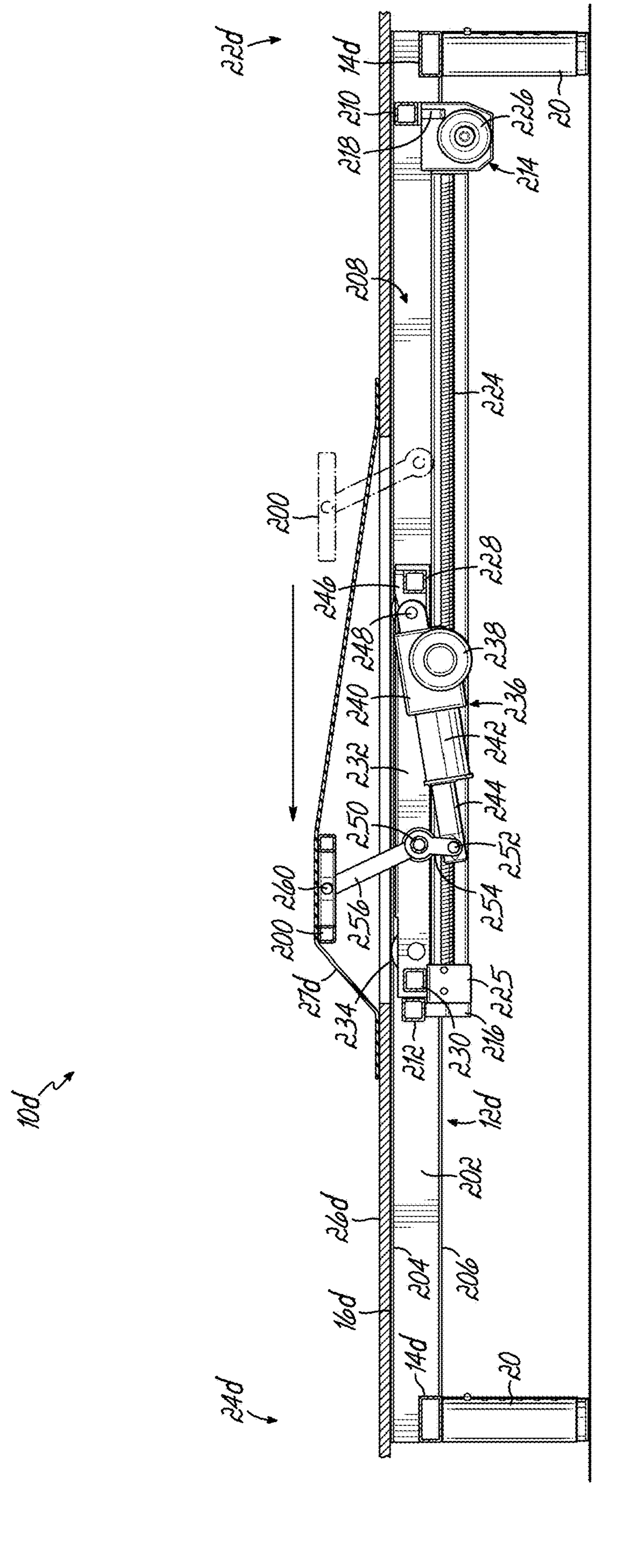
FIG. 16C is a schematic cross-sectional view of the bedding foundation of FIG. 13 with the movable carriage in its downstream position with the massager in a raised position.
Figure 16D:
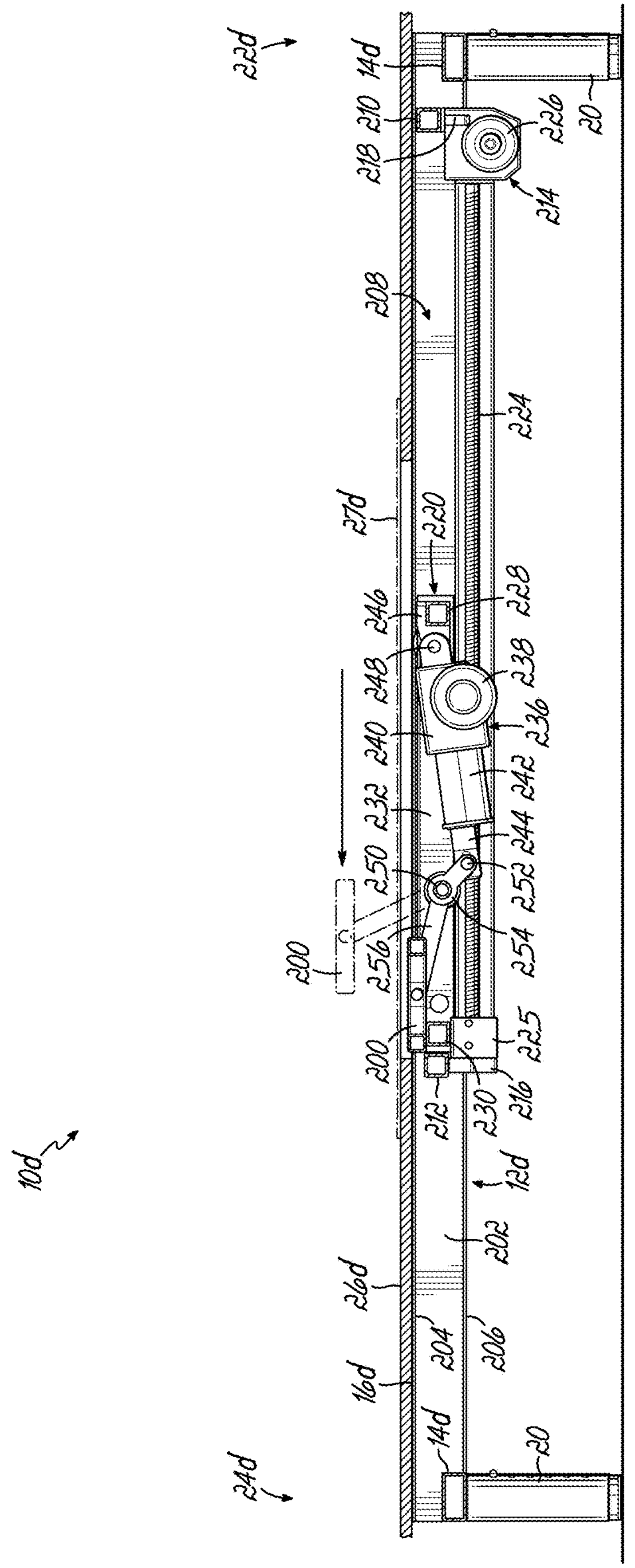
FIG. 16D is a schematic cross-sectional view of the bedding foundation of FIG. 13 with the movable carriage in its downstream position showing the massager in a lowered position.
Figure 16E:
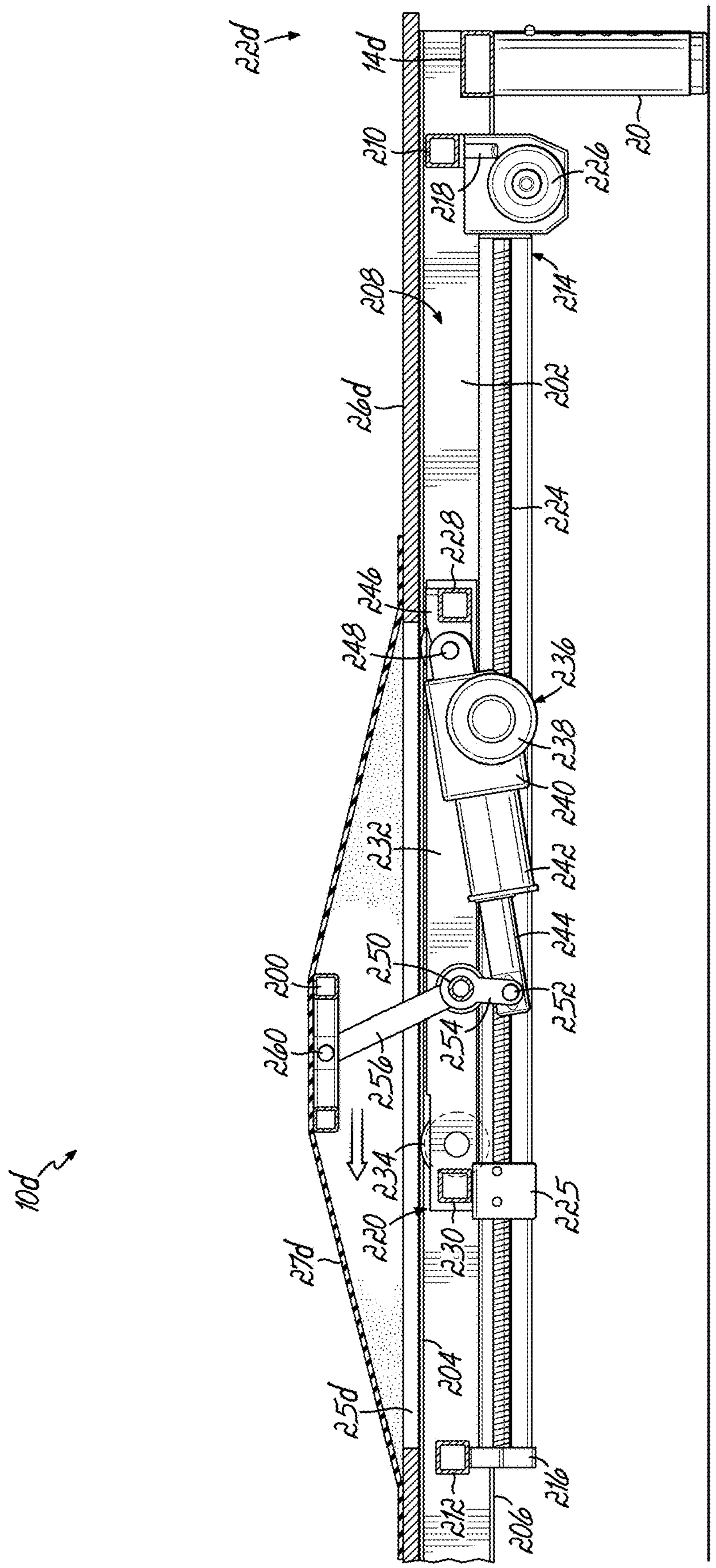
FIG. 16E is a schematic cross-sectional view of the bedding foundation of FIG. 13 showing the movable carriage moving from its home position to its downstream position showing the massager in a raised position.
Figure 17:
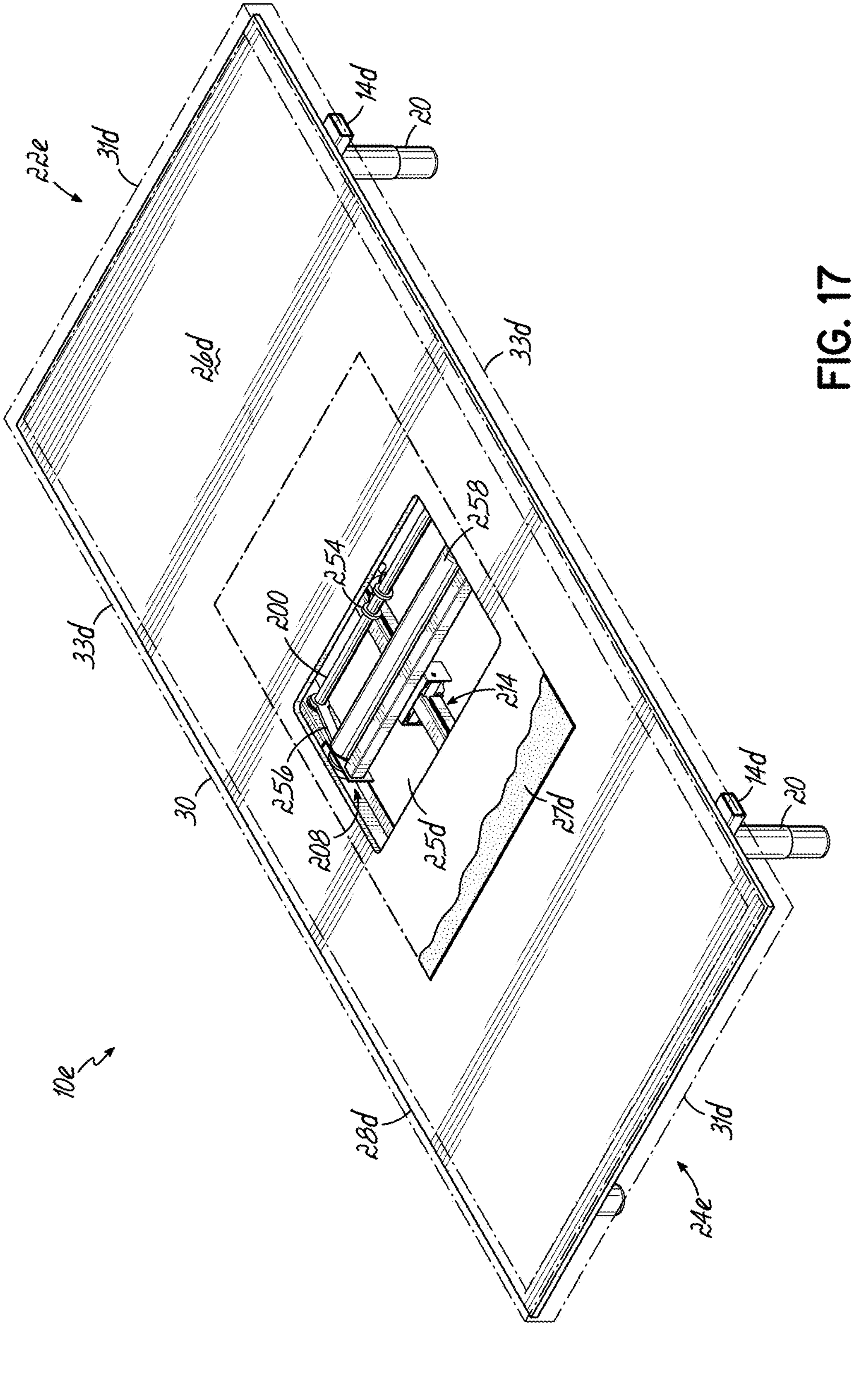
FIG. 17 is a top perspective view of another embodiment of bedding foundation.
Figure 18:
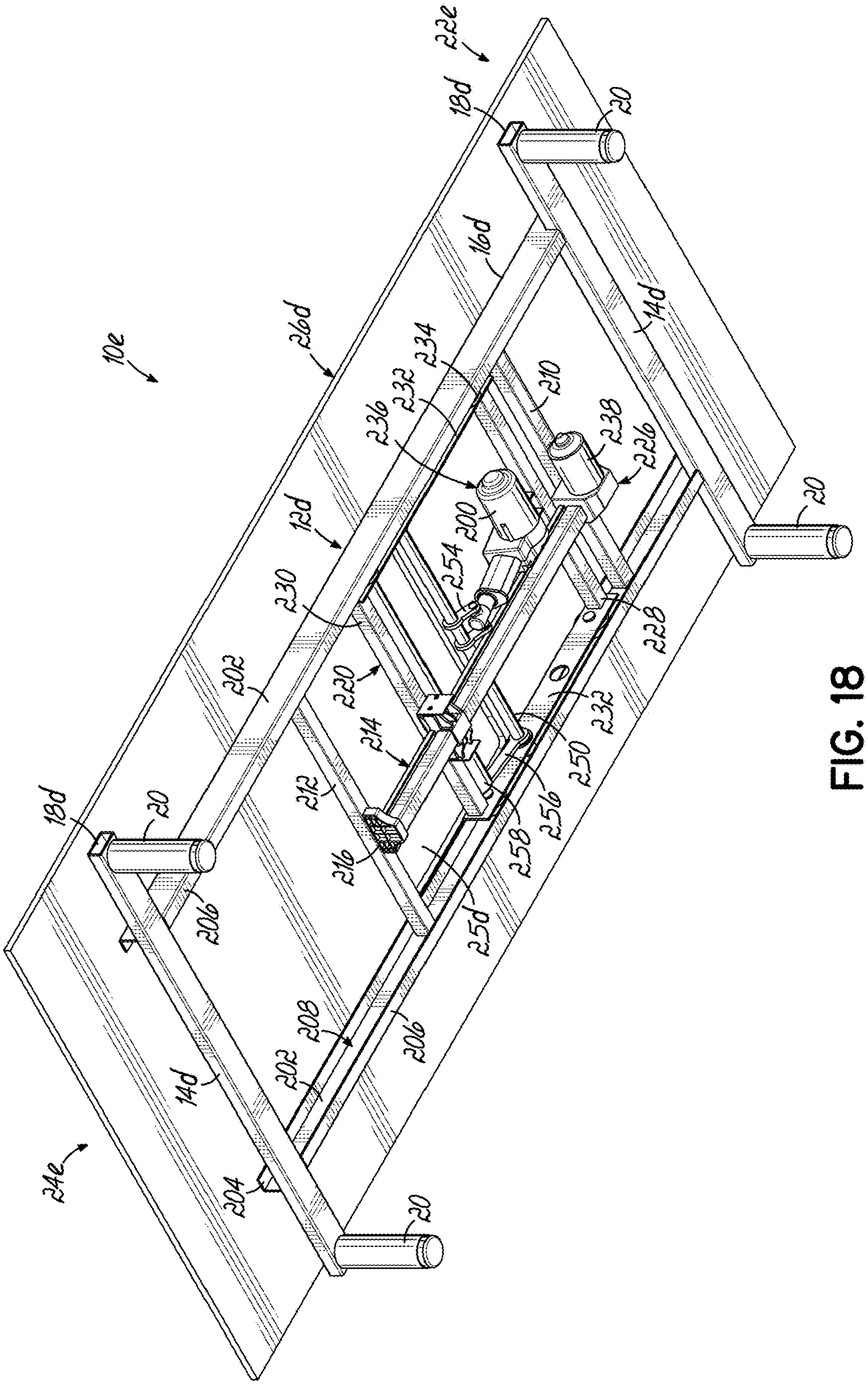
FIG. 18 is a bottom perspective view of the bedding foundation of FIG. 17.
Figure 19:
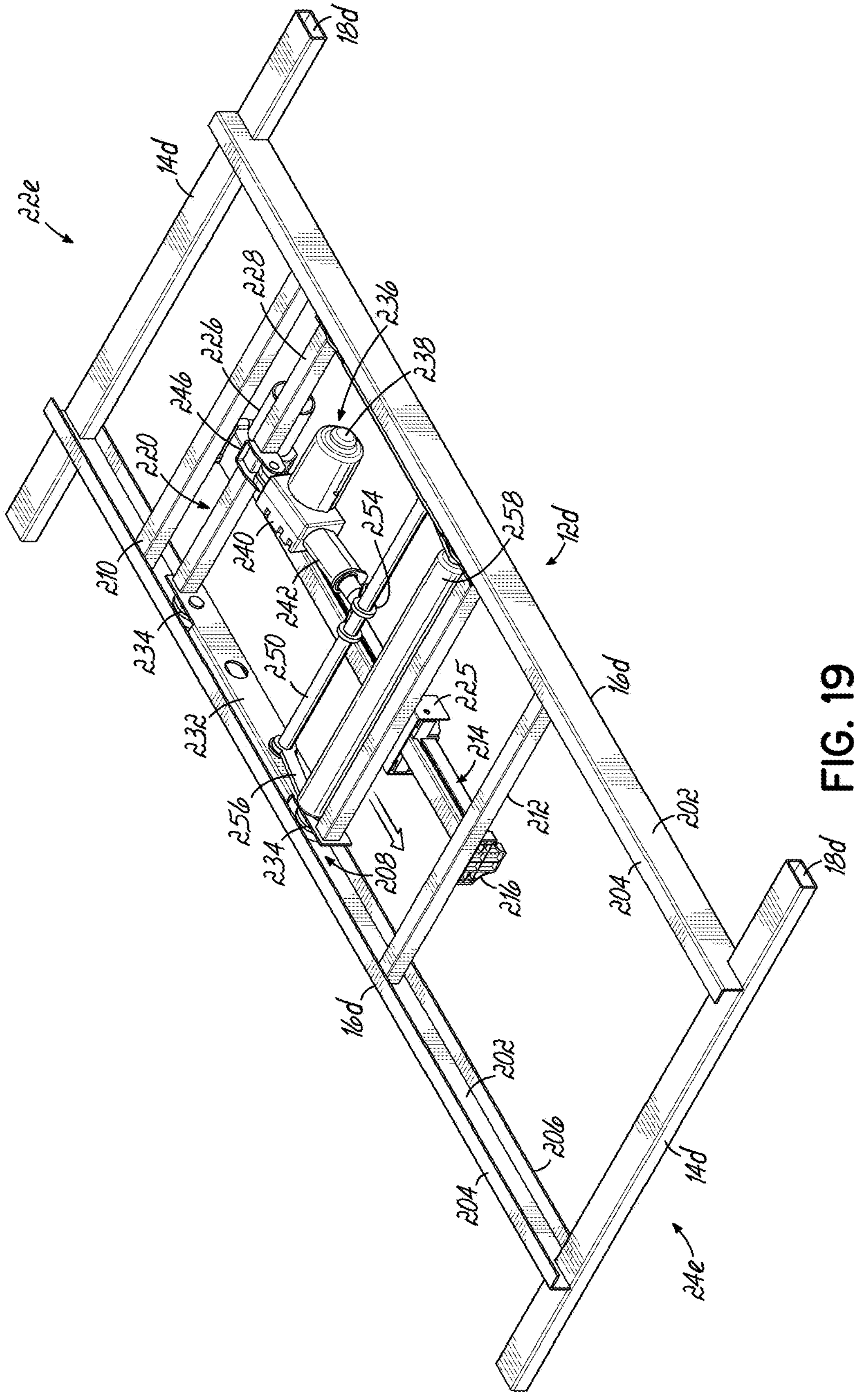
FIG. 19 is a partially disassembled view of the bedding foundation of FIG. 17.
Figure 20A:
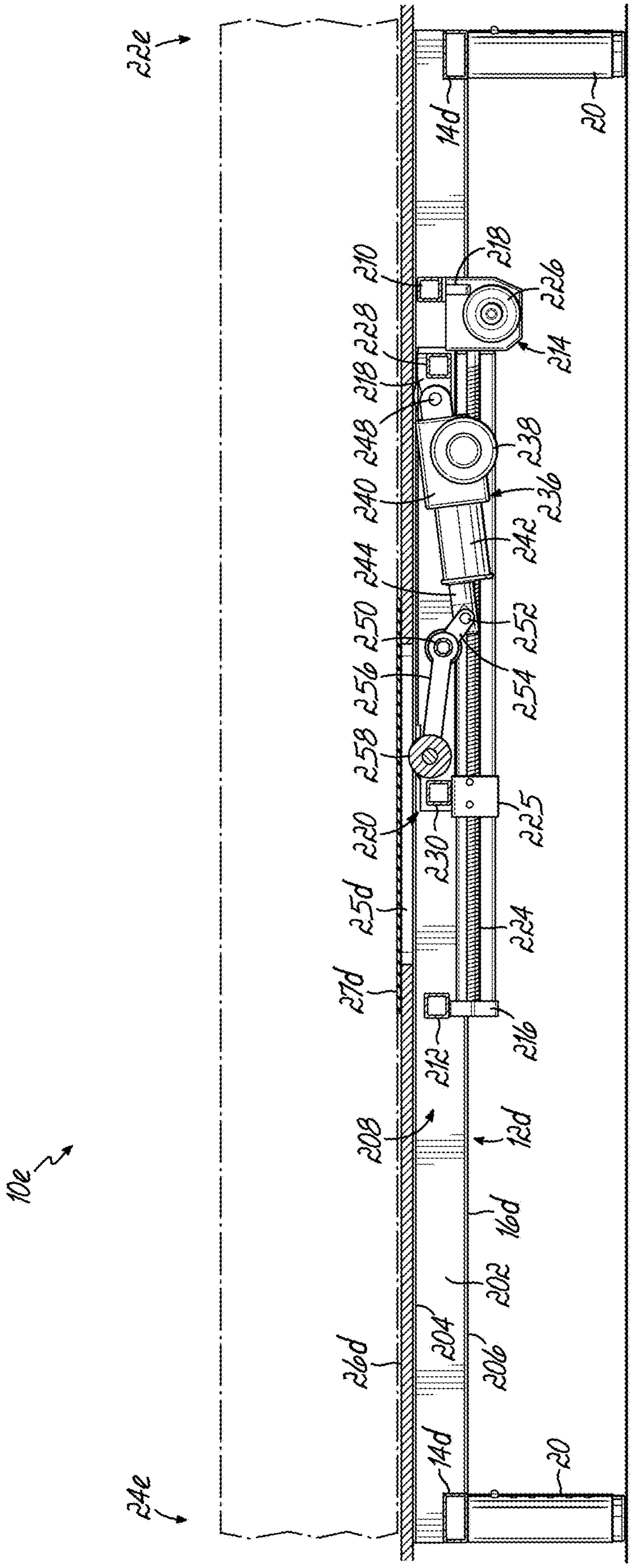
FIG. 20A is a schematic cross-sectional view of the bedding foundation of FIG. 17 with the movable carriage in its home position and the massager in its lowered position.
Figure 20B:
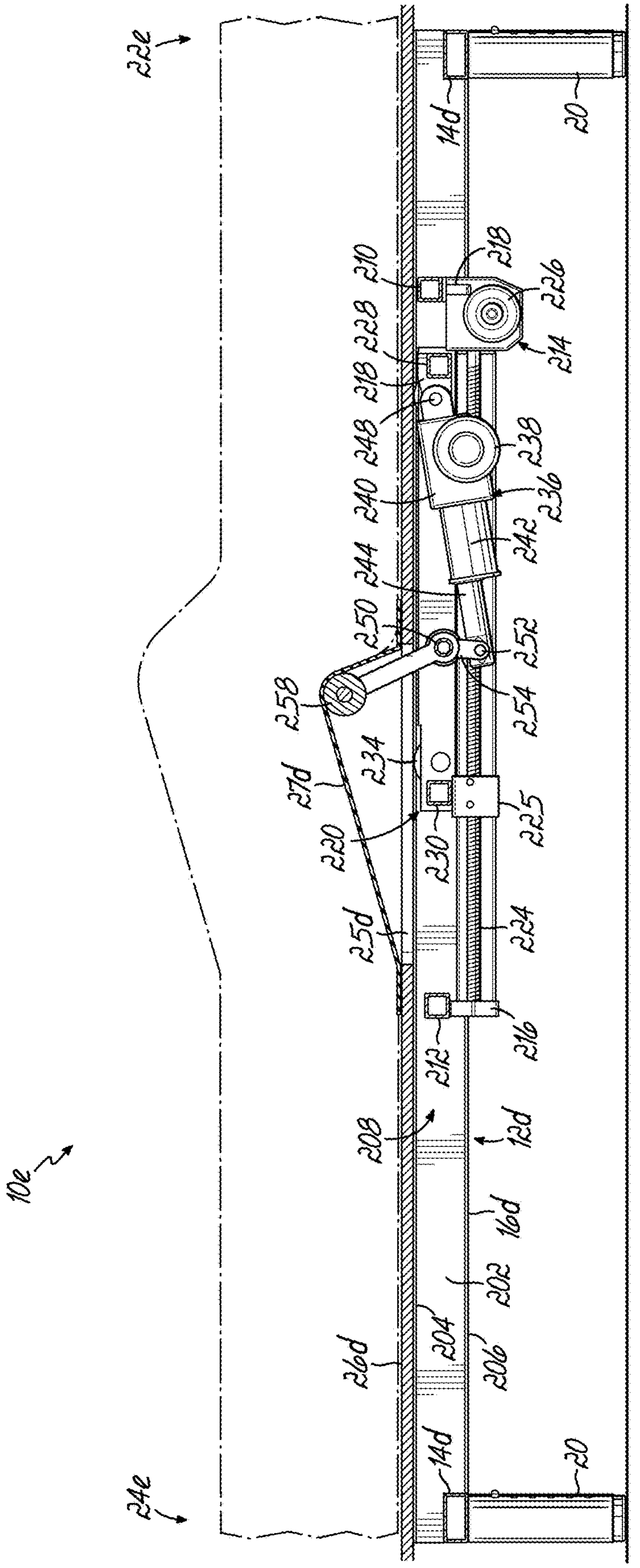
FIG. 20B is a schematic cross-sectional view of the bedding foundation of FIG. 17 with the movable carriage in its home position showing the massager in a raised position.
Figure 20C:
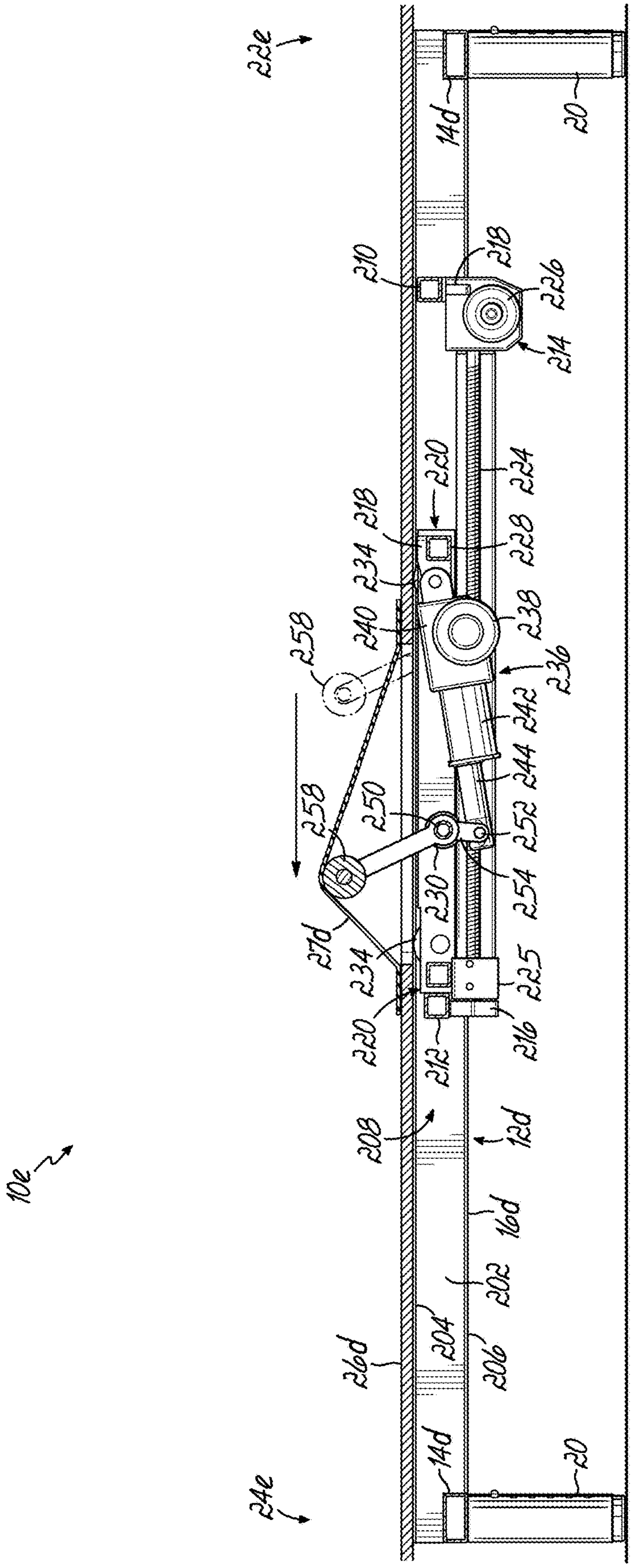
FIG. 20C is a schematic cross-sectional view of the bedding foundation of FIG. 17 with the movable carriage in its downstream position with the massager in a raised position.
Figure 20D:
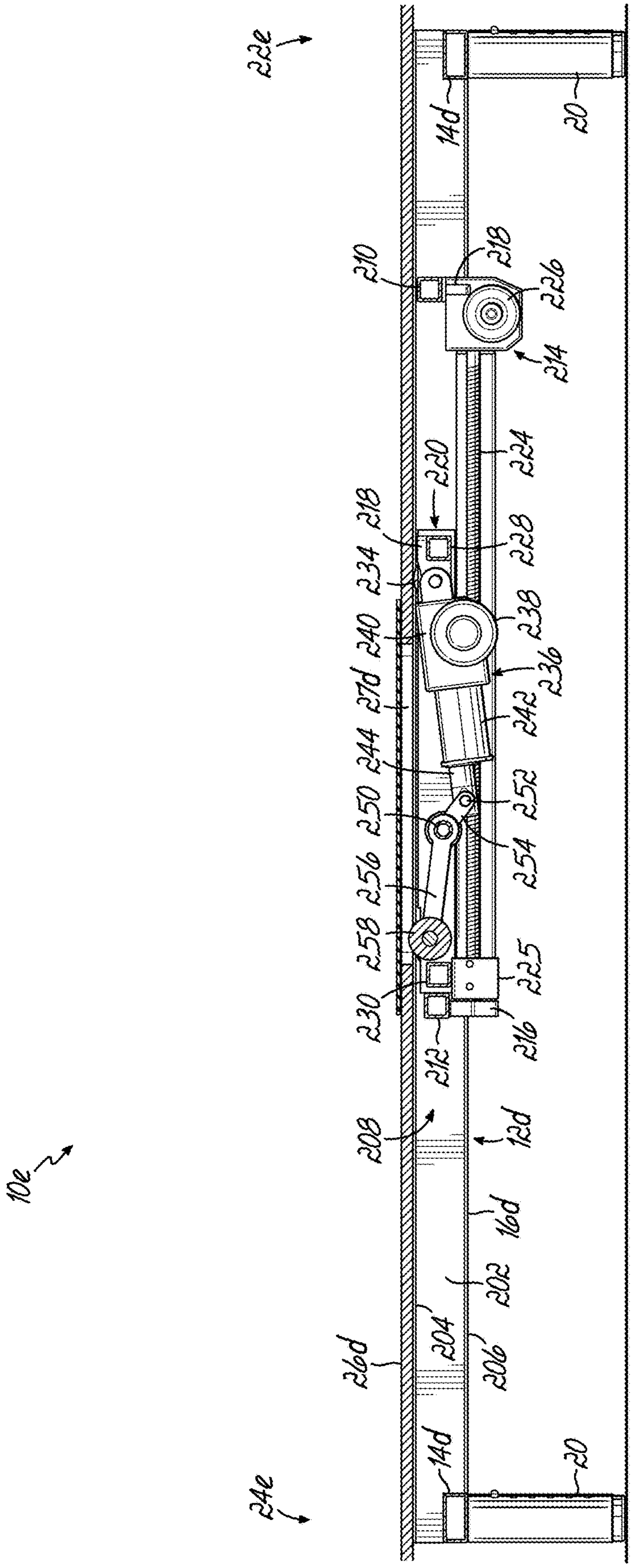
FIG. 20D is a schematic cross-sectional view of the bedding foundation of FIG. 17 with the movable carriage in its downstream position showing the massager in a lowered position.

FIGS. 16A-16E show the operation of bedding foundation 10*d*. FIG. 6A shows the movable carriage 220 in its home position with the massager 200 in its lowered position. FIG. 16B shows the movable carriage 220 in its home position with the massager 200 in its raised position due to pivoting or rotation of the torque tube 250 due to extension of the piston 244 out of the cylinder 242 upon activation of the lift motor 238. FIG. 16C shows the massager 200 still in its raised position while the movable carriage 220 moves downstream to its downstream position. The position of the massager 200 is shown in dashed lines in FIG. 16C before the movable carriage 220 moves to its downstream position. FIG. 16D shows the movable carriage 220 in its downstream position, but the massager 200 being lowered from its raised position shown in dashed lines to its lowered position. FIG. 16E is an enlarged view showing the massager 200 in its raised position while moving downstream due to rotation of the threaded rod 224 caused by activation of the actuator motor 226.

FIGS. 17-20D illustrate another embodiment of bedding foundation 10*e* identical to bedding foundation 10*d* but having a different massager. The massager 258 of bedding foundation 10*e* is a roller, rather an oval-shaped member like massager 200 of bedding foundation 10*d*. For simplicity, like numbers are used to represent like parts.

For purposes of this document, the head end of the bedding foundation 10*e* will be indicated by the numeral 22*e* while the foot end of the bedding foundation 10*d* will be indicated by the numeral 24*e*.

Figure 21:
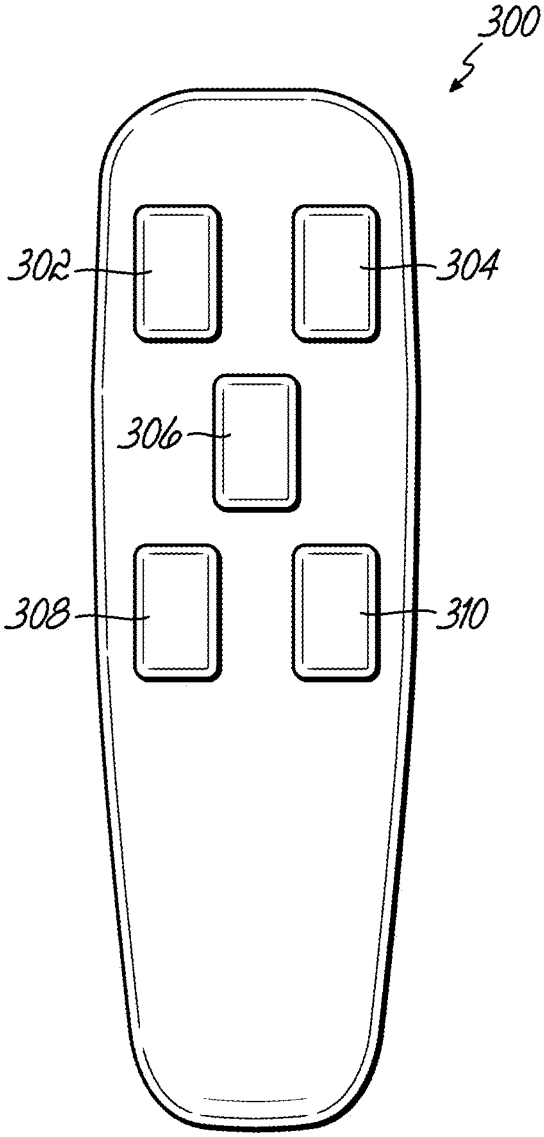
FIG. 21 is a schematic top view of a wireless remote control model which may be used with the bedding foundation of FIGS. 17-20*d* or the bedding foundation of FIGS. 13-16E.

The embodiments of bedding foundation 10*d* and 10*e* each may be controlled via a remote control 300 (shown in FIG. 21) to control the motorized linear actuator 214 and the lift motor assembly 236 separately. FIG. 21 shows a push button 302 which activates the motorized linear actuator 214 and a push button 304 which activates the lift motor assembly 236. The remote 300 could also have one push button 306 which activates both the motorized linear actuator 214 and the lift motor assembly 236 simultaneously. The remote 300 may have a push button 308 which moves the motorized linear actuator 214 to a preset position and the lift motor assembly 236 to a preset position. Additionally, the remote 300 may have a push button 310 for an autorun feature which moves the motorized linear actuator 214 and lift motor assembly 236 in a preprogrammed sequence that may be repeated. Although FIG. 21 shows the push buttons described above as being certain sizes, they may be any other desired sizes. Similarly, although FIG. 21 shows the push buttons being at certain locations on the remote 300, they may be in any desired locations. FIG. 21 is not intended to be limiting.

The remote control may have one or more buttons that move motorized linear actuator 214 and lift motor assembly 236 simultaneously or sequentially to a preset position. This preset position may also be reprogrammed to a different position/setting by the user. The remote control may also have a preset position that is not reprogrammable. Depending on the preset button, motorized linear actuator 214 and lift motor assembly 236 might automatically move to another preset position after a certain amount of time has elapsed. Additionally, there are other features may be activated with the buttons on the remote control, such as, massage, wave, underbed light(s), flashlight, timer, lock among others.

As an alternative to a remote control, a user may use a telephone application controller.

The various embodiments of the invention shown and described are merely for illustrative purposes only, as the drawings and the description are not intended to restrict or limit in any way the scope of the claims. Those skilled in the art will appreciate various changes, modifications, and improvements which can be made to the invention without departing from the spirit or scope thereof. The invention in its broader aspects is therefore not limited to the specific details and representative apparatus and methods shown and described. Departures may therefore be made from such details without departing from the spirit or scope of the general inventive concept. For example, the roller concept of the present invention may be used in an adjustable bed base. Any of the hollow members of the bedding foundation may be at least partially solid. The invention resides in each individual feature described herein, alone, and in all combinations of any and all of those features. Accordingly, the scope of the invention shall be limited only by the following claims and their equivalents.

What is claimed is:

1. A bedding foundation comprising:

a generally rectangular frame comprising two end rails and two side rails, each of the end rails being a hollow member and each of the side rails having a C-shaped cross section comprising an upper wall portion, a side wall portion, and a lower wall portion, the frame being supported by legs;

a rigid platform supported by the generally rectangular frame, the rigid platform having a footprint larger than the generally rectangular frame and extending outwardly from the perimeter of the generally rectangular frame, the rigid platform further having an opening;

a cover secured to the rigid platform and covering the opening in the rigid platform;

front and rear cross members secured to the side rails of the generally rectangular frame and extending therebetween;

a motorized linear actuator comprising a threaded rod rotated by an actuator motor and a bus movable upon rotation of the threaded rod, the motorized linear actuator extending between the front and rear cross members for moving the bus;

a movable carriage secured to the bus and being moveable by the motorized linear actuator, said movable carriage including a front carriage member, a rear carriage member and side plates extending between the front and rear carriage members, said movable carriage further comprising four wheels secured to the side plates of the movable roller carriage, two per side, for engaging the side rails of the generally rectangular frame and guiding movement of the movable carriage, the movable carriage further comprising a lift motor assembly, the lift motor assembly comprising a lift motor, a lift motor housing, a cylinder and a piston movable relative to the cylinder, the housing being pivotally supported by a front support bracket, the front support bracket being secured to the front carriage member, the movable carriage further comprising a pivotal torque tube extending between the side plates, a pin extending through the piston of the lift motor assembly and two spaced arms extending between the pin and the torque tube, wherein extension of the piston of the lift motor assembly pivots the torque tube using the arms, the movable carriage further comprising two links, each of the links being welded to the torque tube at one end and being pivotally secured to a massager at the other end, wherein rotation of the torque tube causes movement of the massager between a raised position and a lowered position, and wherein said movable carriage is movable in a horizontal direction by the linear actuator and the massager of the movable carriage is movable in a vertical direction by the lift motor assembly.

2. The bedding foundation of claim 1, further comprising a protective shroud surrounding the rigid platform.

3. The bedding foundation of claim 1, wherein the front and rear cross members secured to the side rails of the generally rectangular frame are hollow.

4. The bedding foundation of claim 1, wherein the massager is oval shaped.

5. The bedding foundation of claim 1, wherein the massager is a roller.

6. The bedding foundation of claim 1, further comprising:

a user interface;

a control box; and a logic chip which receives a command from the user interface and issues a command to the control box, wherein the control box controls electronic signals which control the motorized linear actuator and lift motor assembly via commands sent from the logic chip.

7. The bedding foundation of claim 1, further comprising:

a user interface comprising an application on a mobile phone;

a control box; and a logic chip which receives a Wi-Fi command from the user interface and issues a command to the control box, wherein the control box controls electronic signals which control the motorized linear actuator and lift motor actuator via commands sent from the logic chip.

8. A bedding foundation comprising:

a generally rectangular frame comprising two end rails and two side rails, each of the end rails being a hollow member and each of the side rails having a C-shaped cross section comprising an upper wall portion, a side wall portion, and a lower wall portion, the frame being supported by legs;

a rigid platform supported by the generally rectangular frame, the rigid platform having a footprint larger than the generally rectangular frame and extending outwardly from the perimeter of the generally rectangular frame, the rigid platform further having an opening;

front and rear cross members secured to the side rails of the generally rectangular frame and extending therebetween;

a motorized linear actuator comprising a threaded rod rotated by an actuator motor and a bus movable upon rotation of the threaded rod, one end of the motorized linear actuator being secured to the front cross member and the other end of the motorized linear actuator being secured to a rear mounting bracket;

a movable carriage secured to the bus and being moveable by the motorized linear actuator, said movable carriage including a front carriage member, a rear carriage member and side plates extending between the front and rear carriage members, said movable carriage further comprising four wheels secured to the side plates of the movable carriage, two per side, for engaging the side rails of the generally rectangular frame and guiding movement of the movable carriage, the movable carriage further comprising a lift motor assembly, the lift motor assembly comprising a lift motor, a lift motor housing, a cylinder and a piston movable relative to the cylinder, a pin extending through the piston, the lift motor housing being pivotally supported by a front support bracket, the front support bracket being secured to the front member of the carriage, the movable carriage further comprising a pivotal torque tube extending between the side plates, two spaced arms extending between the pin and the torque tube, wherein extension of the piston of the lift motor assembly pivots the torque tube using the arms, the movable carriage further comprising a massager and links extending between the massager and the torque tube of the movable carriage, wherein said movable carriage is movable in a horizontal direction by the motorized linear actuator and the massager of the movable carriage is movable in a vertical direction by the lift motor assembly.

9. The bedding foundation of claim 8, further comprising a cover secured to the rigid platform and covering the opening in the rigid platform.

10. The bedding foundation of claim 8, further comprising a protective shroud surrounding the rigid platform.

11. The bedding foundation of claim 8, wherein the front and rear cross members secured to the side rails of the generally rectangular frame are hollow.

12. The bedding foundation of claim 8, wherein the massager is oval shaped.

13. The bedding foundation of claim 8, wherein the massager is a roller.

14. The bedding foundation of claim 8, further comprising:

a user interface;

a control box; and a logic chip which receives a command from the user interface and issues a command to the control box, wherein the control box controls electronic signals which control the motorized linear actuator and lift motor assembly via commands sent from the logic chip.

15. The bedding foundation of claim 8, further comprising:

a user interface comprising an application on a mobile phone;

a control box; and a logic chip which receives a Wi-Fi command from the user interface and issues a command to the control box, wherein the control box controls electronic signals which control the motorized linear actuator and lift motor actuator via commands sent from the logic chip.

16. The method of claim 15, wherein the bedding foundation further comprises a user interface; a control box; and a logic chip which receives a command from the user interface and issues a command to the control box, wherein the control box controls electronic signals which control the motorized linear actuator and lifter via commands sent from the logic chip.

17. A method of providing a massaging feeling to a mattress from a massage mechanism built into a bedding foundation, the method comprising: raising a single massager though an opening in a rigid platform using a lift motor assembly, the massager remaining below a flexible cover covering the opening in the rigid platform, the rigid platform being supported by a generally rectangular frame supported by legs, the rigid platform having a footprint larger than the generally rectangular frame and extending outwardly from the perimeter of the generally rectangular frame; moving the massager from front to back inside the opening with the massager in its raised position by activating a linear actuator, the linear actuator comprising a motor for rotating a threaded rod, the linear actuator extending between cross members extending between side rails of the generally rectangular frame, the linear actuator moving a bus, a carriage bracket secured to the bus, the carriage further comprising wheels engaging the side rails for guiding movement of the carriage; wherein the lift motor assembly lifts the massager when activated, the massager being secured to links connected to arms of the lift motor assembly, the arms being rotated by a lift motor wherein the lift motor assembly lifts the massager by extending a piston, thereby moving the arms to rotate a torque tube wherein rotation of the torque tube lifts the massager using the links.

18. The method of claim 17, wherein the motorized linear actuator and lift motor assembly are activated by electrical signals sent from a logic chip inside a control box, the logic chip receiving electrical signals from a user interface.

* * * * *